United States Patent
Shimizu et al.

(10) Patent No.: US 6,543,569 B1
(45) Date of Patent: Apr. 8, 2003

(54) ELECTRIC POWER STEERING APPARATUS

(75) Inventors: Yasuo Shimizu, Wako (JP); Yasuharu Ohyama, Wako (JP); Katsuji Watanabe, Wako (JP); Shigeru Yamawaki, Wako (JP); Atsuhiko Yoneda, Wako (JP); Yasuhiro Terada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/680,699

(22) Filed: Oct. 6, 2000

(30) Foreign Application Priority Data

| Oct. 8, 1999 | (JP) | 11-288843 |
| Nov. 19, 1999 | (JP) | 11-330648 |
| Nov. 26, 1999 | (JP) | 11-336837 |
| Dec. 7, 1999 | (JP) | 11-347893 |

(51) Int. Cl.$^7$ .................................................. B62D 5/04
(52) U.S. Cl. ................. 180/444; 74/665 C; 74/388 PS; 74/458
(58) Field of Search ....................... 180/443, 444, 180/446; 74/388 PS, 458, 462, 468, 498, 665 C

(56) References Cited

U.S. PATENT DOCUMENTS

| 3,665,783 A | * | 5/1972 | Arnold | 74/498 |
| RE28,740 E | * | 3/1976 | Bishop | 74/422 |
| 4,149,431 A | * | 4/1979 | Rouverol | 74/462 |
| 4,189,955 A | * | 2/1980 | Bishop | 74/498 |
| 4,215,591 A | * | 8/1980 | Bishop | 74/422 |
| 4,222,282 A | | 9/1980 | Taig | |
| 4,572,005 A | * | 2/1986 | Kita | 73/862.36 |
| 4,681,183 A | * | 7/1987 | Oshita | 180/443 |
| 4,940,102 A | * | 7/1990 | Morishita | 180/143 |
| 5,288,556 A | * | 2/1994 | Lemelson | 428/408 |
| 5,341,891 A | * | 8/1994 | Wada et al. | 180/443 |
| 5,445,237 A | * | 8/1995 | Eda et al. | 180/79.1 |
| 5,860,323 A | * | 1/1999 | Mizutani et al. | 74/422 |
| 5,927,429 A | * | 7/1999 | Sugino et al. | 180/444 |
| 6,041,885 A | * | 3/2000 | Watanabe et al. | 180/444 |
| 6,155,376 A | * | 12/2000 | Cheng | 180/444 |

FOREIGN PATENT DOCUMENTS

| JP | 59017063 | 1/1984 |
| JP | 59020770 | 2/1984 |
| JP | 59020771 | 2/1984 |
| JP | 61004797 | 1/1986 |
| JP | 61160359 | 7/1986 |
| JP | 06221940 | 9/1994 |
| JP | 09193815 | 7/1997 |

* cited by examiner

*Primary Examiner*—Lesley D. Morris
*Assistant Examiner*—Daniel Yeagley
(74) *Attorney, Agent, or Firm*—Merchant & Gould P.C.

(57) ABSTRACT

An electric power steering apparatus comprising a rack shaft having two racks, a first rack-and-pinion mechanism for transferring a steering torque to the rack shaft, and a second rack-and-pinion mechanism for transferring an assist torque to the rack shaft. The second rack-and-pinion mechanism includes a pinion and a rack both being helical gears so that a large torque can be transmitted to the rack shaft. Teeth of the pinion and rack are arc profiled. The arc profiled teeth mesh with each other through a large contact area of concave and convex surfaces thereof and hence with a reduced contact pressure compared to involute profiled teeth. The arc profiled teeth thus have increased surface fatigue strength, bending strength and bending fatigue strength and can transmit an assist torque sufficiently to the rack shaft. Moreover, they have durability sufficient to withstand a torque load of a motor inertia.

11 Claims, 26 Drawing Sheets

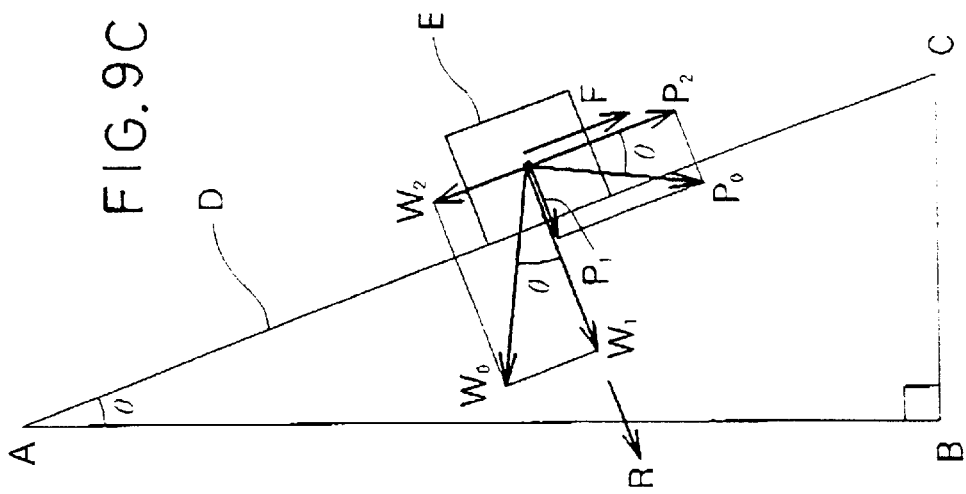
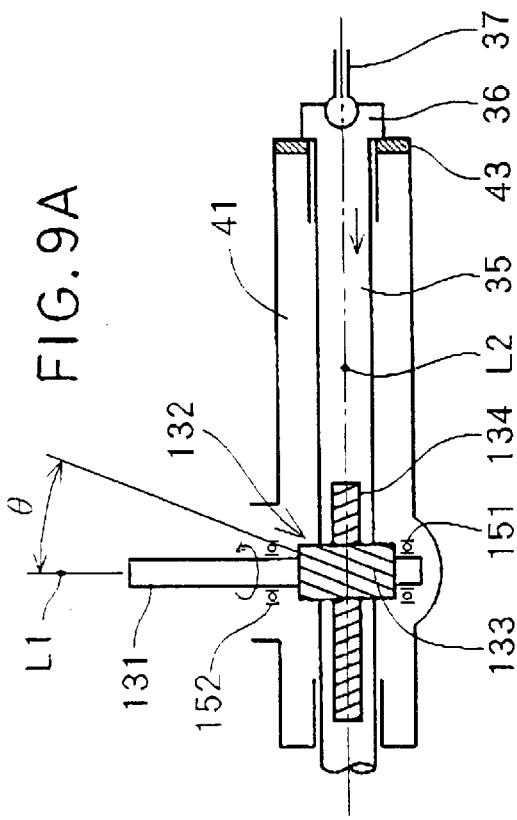

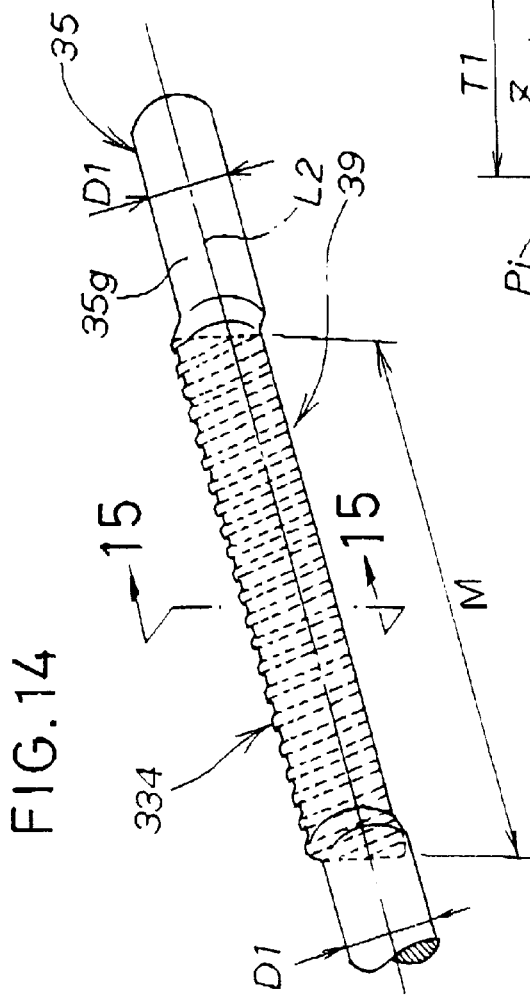
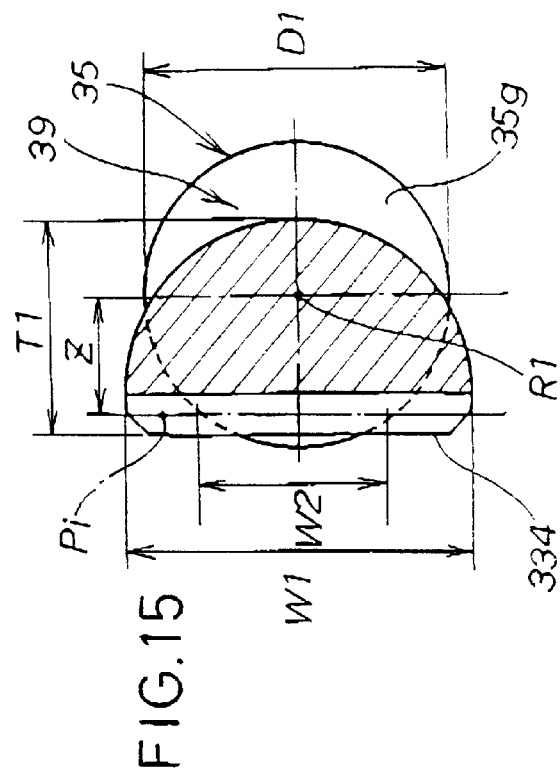
FIG. 14
FIG. 15

FIG.18
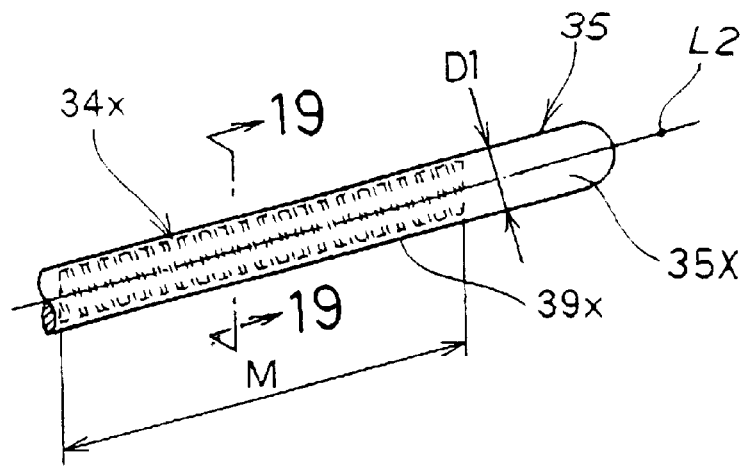
FIG.19
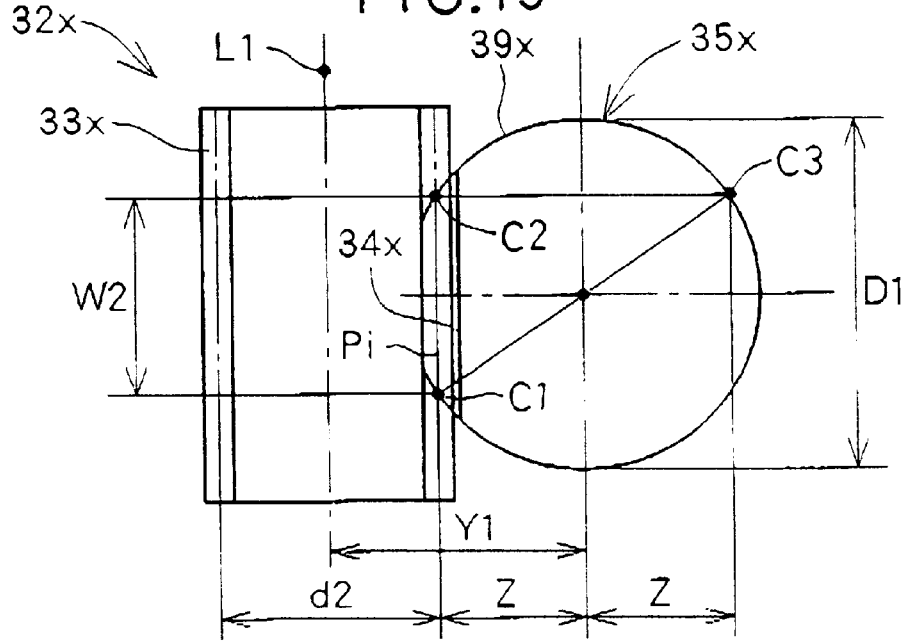
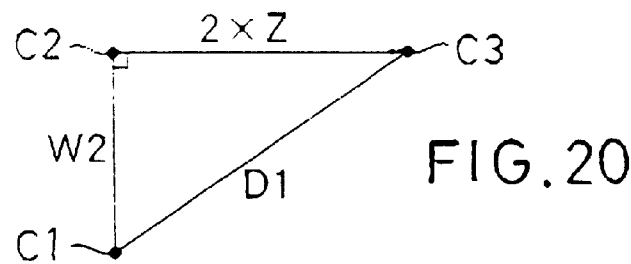
FIG.20

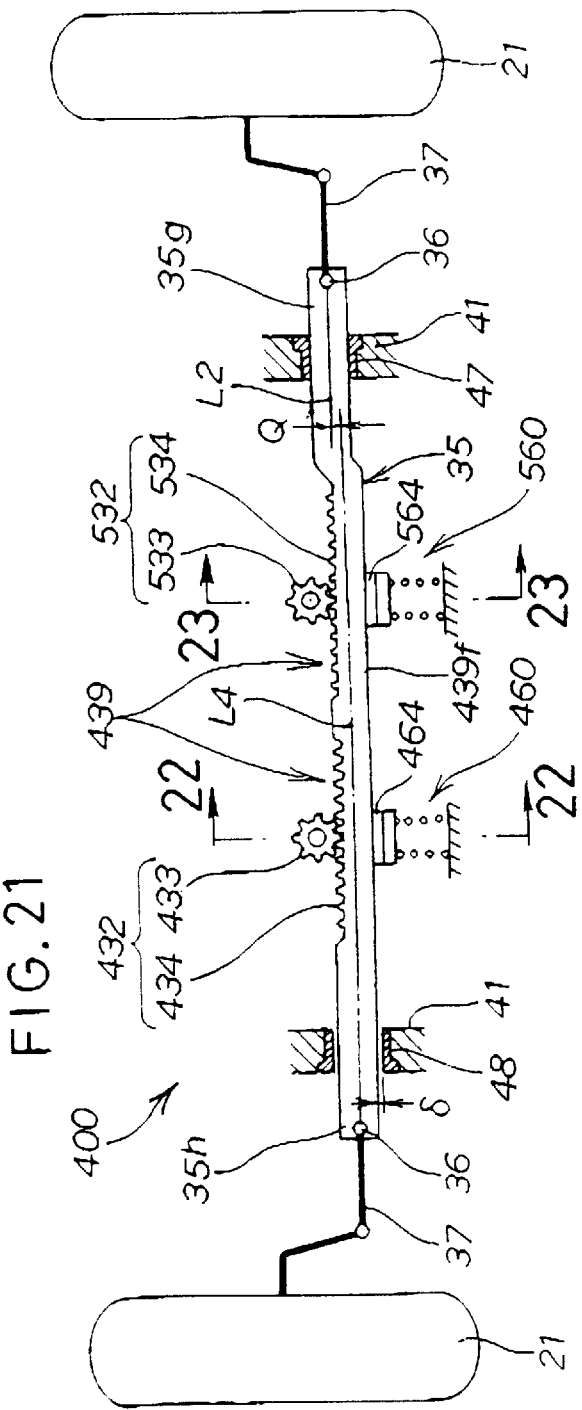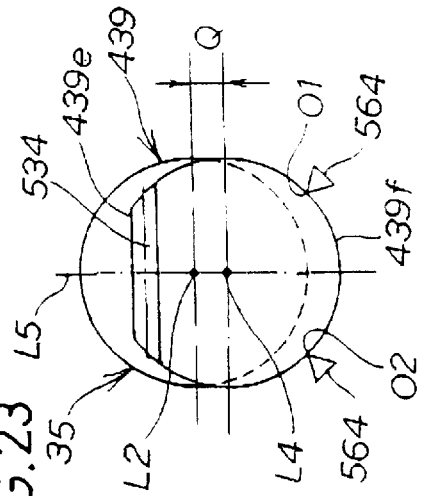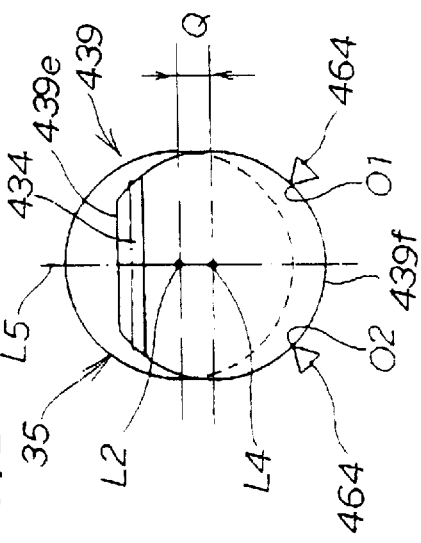

ELECTRIC POWER STEERING APPARATUS

BACKGROUND OF THE INVENTION

1. Field of the Invention

The present invention relates generally to an electric power steering apparatus, and more particularly to an improvement in a rack-and-pinion mechanism used in such an electric power steering apparatus.

2. Description of the Related Art

Electric power steering systems are commonly used to make steering easier by reducing a force needed to turn a steering wheel (referred to as the steering force below). Electric power steering systems use an electric motor to produce assist torque according to the steering torque, and transfer the assist torque to the rack-and-pinion mechanism of the steering system, as taught in, for example, Japanese Patent Laid-Open Publication (kokai) No. SHO-61-160359.

The disclosed electric power steering apparatus includes a single rack shaft designed for meshing engagement with first and second pinions to thereby steer right and left steered wheels. Steering torque produced by turning a steering wheel is transmitted via the first pinion to the rack shaft while an assist torque produced by an electric motor is transmitted via the second pinion to the rack shaft. The rack shaft steers the steered wheels by the combined steering torque and assist torque. In the conventional electric power steering apparatus, since the rack-and-pinion mechanism for transmitting the steering torque is separated from the rack-and-pinion mechanism for transmitting the assist torque, each rack-and-pinion mechanism can advantageously be made to have smaller strength than a unified rack-and-pinion mechanism.

An automotive steering system also usually has a stopper mechanism for limiting the maximum turning angle of the steering wheels. More specifically, the stopper mechanism has a rack end stopper attached at each longitudinal end of the housing in which the rack shaft is slidably disposed, and a ball joint, for example, is attached to each end of the rack shaft. When the rack shaft slides a specific distance, the ball joint contacts the rack end stopper. The maximum turning angle of the steering wheels is thus limited by limiting the movement of the rack shaft.

As the rack shaft is slid a specific distance, its further movement is restricted by the stopper mechanism. Upon stoppage of the rack shaft, the second pinion is fed with a torque proportionate to the square of a reduction gear ratio due to motor inertia and is thus supplied with a larger assist torque than it is in a normal operation. The assist torque becomes maximum at this time and larger than the steering torque. Consequently, the second rack-and-pinion mechanism needs to have strength sufficient to withstand the maximum torque. For this purpose, one may propose to make each component have increased strength but this requires a larger rack-and-pinion module and high quality materials, thereby rendering the rack-an-pinion mechanism large in size and expensive.

SUMMARY OF THE INVENTION

It is therefore an object of the present invention to provide an electric power steering apparatus including a first rack-and-pinion mechanism for transmitting a steering torque and a separate second rack-and-pinion mechanism for transmitting an assist torque with strength and durability sufficient to with stand a torque load of motor inertia.

According to an aspect of the present invention there is provided an electric power steering apparatus which comprises: a rack shaft for steering wheels, the rack shaft having a first rack and a second rack provided separately axially thereof; a first rack-and-pinion mechanism for transferring a steering torque, produced by turning a steering wheel, to the rack shaft; an electric motor for producing an assist torque in accordance with the steering torque; and a second rack-and-pinion mechanism, comprised of a pinion and the second rack, for transferring via a geared reduction mechanism the assist torque to the rack shaft, the pinion and rack of the second rack-and-pinion mechanism both being helical gears, one of the helical gears having a tooth profile wherein at least an a dedendum is a circular arc generally centered on a reference pitch line, the other of the helical gears having a tooth profile wherein at least a addendum is a circular arc generally centered on the reference pitch line.

With the rack and pinion being formed of helical gears, the second rack-and-pinion mechanism can transfer a larger torque than a conventional spur gear.

The tooth profile of the pinion and rack of the second rack-and-pinion mechanism of the present invention is a curved arc. Because a conventional involute tooth profile is convex, meshing in a gear pair is contact between two convex surfaces. With the curved arc tooth profile of the present invention, however meshing in a gear pair occurs as contact between a convex surface and a concave surface. The contact area is thus increased, whereby contact pressure is reduced to approximately $\frac{1}{6}$ that of an involute tooth profile. By thus using a curved arc tooth profile in the rack and pinion of the second rack-and-pinion mechanism, surface fatigue strength, bending strength, and bending fatigue strength are greater than with an involute tooth profile. This means that the rack-and-pinion mechanism of our invention can transfer the assist torque sufficiently, even when the assist torque from the motor is larger than that in a normal operation of the motor.

Since it transfers only a driver's steering torque, the first rack-and-pinion mechanism is not fed with a steering torque extremely large compared with one in normal driving conditions, even when the rack shaft is stopped. It is thus not necessary to increase rigidity of the mechanism.

When the steered wheels turn right or left to the maximum steering angle and the rack shaft meets the rack end stopper, that is, when the rack shaft moves to the end of its range of movement, the rack drops immediately. Because the torque at this time is impact torque and not static torque, it is significantly higher than during normal driving conditions. However, because the helix angle of the helical gear pinion is less than the helical gear friction angle, thrust does not act on the pinion. Thrust acting on the pinion is only an extremely weak force occurring during normal conditions when the rack is not stopped at the right or left end of its range.

The geared reduction mechanism of the present invention is preferably a combination of driver and driven gears in which the tooth surfaces of the driver gear and/or the tooth surfaces of the driven gear are coated with a low friction material coating, and the driver gear and driven gear mesh with no backlash. Coating with a low friction coefficient material can be achieved by imparting a coating made from a low friction coefficient material, or by impregnating the tooth surfaces with a low friction coefficient material.

By thus meshing driver gear and driven gear with no backlash, there is no play between the driver and driven gears, and impact torque due to motor inertia does not pass from the driver gear tooth surface to the driven gear tooth surface. Moreover, the tooth surfaces of one or both of the driver gear and driven gear are coated with a low friction coefficient material coating. By lowering the coefficient of friction between the tooth surfaces of the driver and driven gears by means of this coating, power transfer efficiency can be increased even though there is no play between the driver and driven gears.

It is further preferable to insert a torque limiter between the motor and the geared reduction mechanism to limit the transfer of assist torque exceeding a specific limit from the motor to the reduction mechanism. When the rack shaft hits the rack end stopper, excessive torque will not be produced as a reaction to the motor, and excessive torque will not be transferred to the load side.

It is yet further preferable to provide a steering torque sensor for detecting steering torque. Yet further preferably the steering torque sensor is a magnetostrictive sensor for detecting magnetostriction of the pinion shaft of the rack-and-pinion mechanism. By using such a steering torque sensor, it is not necessary to divide the input shaft into two parts lengthwise and connect these two parts using a torsion bar as It is when steering torque is detected using the method of a conventional electric power steering apparatus. It is therefore also possible to lengthen the input shaft. Machining precision is increased by lengthening the pinion shaft, and the pinion and rack thus mesh more precisely. There is a particularly strong correlation between meshing precision and power transfer efficiency in a rack-and-pinion mechanism having a curved arc tooth profile, and improving meshing precision is therefore important.

The pinion and/or rack of the rack-and-pinion mechanism in the present invention is yet further preferably a forging or other plastically processed part. There are, therefore no process marks left on the tooth surface as there are when the tooth surfaces are conventionally machined, and the surface roughness of the gear teeth is smooth. Friction force from sliding gear tooth surfaces is thus reduced, and the power transfer efficiency of the rack-and-pinion mechanism is increased.

Furthermore, because the pinion and rack are plastically processed parts, there is no residual stress produced in the tooth surfaces as there is with machining processes, and there is thus less deformation during hardening. A good tooth surface with low strain can therefore be achieved without correcting the tooth profile after hardening. In other words, because these parts are plastically processed, the surface roughness condition of the teeth is good with little strain from hardening or tool marks left. In addition, strength is increased because a fiber structure flowing continuously along the tooth profile is achieved through plastic processing, and bending strength and wear resistance are greater compared with machined gears in which the fiber structure is interrupted.

By processing the teeth of the rack and pinion to a curved arc tooth profile, and achieving this curved arc tooth profile in the rack and pinion by means of forging or other plastic processing technique, contact pressure is reduced, a good surface roughness condition is achieved, and interruption of the oil membrane formed by the lubricating fluid can be prevented. An electric power steering apparatus with little motor output loss can thus be provided because contact resistance between tooth surfaces can be significantly reduced and the power transfer efficiency of the rack-and-pinion mechanism improved.

Furthermore, by using forgings or otherwise plastically processed components for the curved arc tooth profile pinion and rack, it is possible to provide an electric power steering apparatus featuring improved mechanical properties in the materials, less tooth base stress, reduced wear, and outstanding strength and durability.

Yet further preferably, the rack shaft to which the rack is formed is comprised so that the back on the side opposite that to which the rack is formed is pushed toward the pinion by an adjustment bolt by way of intervening rack guide member and compression spring, particularly so that the adjustment bolt pushes directly against the back of the rack guide member when the pinion and rack mesh.

Good meshing between the pinion and rack can be maintained as a result of the rack guide member constantly pushing the rack shaft to the pinion, and the power transfer efficiency of the rack-and-pinion mechanism can thus be stabilized. Assist torque from the motor can be particularly transferred efficiently from the pinion to the rack shaft even during high load conditions such as turning the wheels when the vehicle is stopped. Therefore, compared with using a conventional involute tooth profile, less assist torque is needed, and a low power consumption electric power steering apparatus can be provided.

Moreover, tooth surface wear is reduced because the curved arc tooth profile is formed by forging or other plastic processing method. It is therefore possible to provide an electric power steering apparatus having a rack-and-pinion mechanism with little play even without applying pressure using an adjustment spring Furthermore, because the tooth profile of the rack and pinion is a curved arc as described above, the contact area of meshed teeth is greater than that with an involute tooth profile. Because the contact pressure drops, tooth surface sliding is also smoother. A good steering feel can also be maintained in the steering wheel even though an adjustment bolt directly supports the rack shaft so that the rack shaft will not move back in reaction to the strong force produced perpendicular to the longitudinal axis when high torque due to motor inertia acts on the rack-and-pinion mechanism.

The rack shaft on which the rack is formed is housed unrockably and slidably in the longitudinal direction in a housing. A rocking force is produced on the rack shaft when the pinion and rack are helical gears, but this rocking action of the rack shaft is restricted in the present invention. Good meshing between the pinion and rack can thus be maintained.

More specifically, the back of the rack shaft opposite the surface on which the rack is formed is convex, and a rack guide is disposed having a concave end for contacting convex back at contact points, and pushing the convex back of the rack shaft toward the rack. These contact points are set in relation to the rack shaft supported by the housing so the concave end limits rocking of the convex part of the rack shaft when a rocking force acts on the rack shaft. The rack shaft is thereby housed so that it cannot rock in the housing.

The rack guide preferably pushes the guide member having the concave end to the rack shaft side by means of adjustment bolt and intervening compression spring. The adjustment bolt pushes directly on the back of the surface to which the concave end is formed to the guide member when the pinion and rack mesh.

When torque is transferred from the pinion to the rack during steering, forces act on the rack shaft in the direction of the longitudinal axis and in the direction perpendicular thereto. Because the adjustment bolt pushes directly against the back of the guide member, the rack cannot move back as a result of force in the longitudinal axis direction. Good meshing between the pinion and rack can thus be always maintained. Moreover, the contact area is great and contact pressure between meshing surfaces is reduced as a result of the curved arc tooth profile, and sliding between the tooth surfaces is therefore smoother.

Yet further preferably, a supported part whereby the rack shaft is supported on a housing by way of intervening bearings, and a rack formation part to which the rack is formed, are disposed to the rack shaft. The section perpendicular to the axis of the rack formation part is a circular section equal in diameter to the supported part, and the distance from the center of this circular section to the reference pitch line is set to a specific dimension. The actual tooth width of the rack is greater than the rack tooth width determined by this specific dimension.

By thus making the tooth width of the rack actually greater than the tooth width of a conventional rack, the mechanical strength (bending strength and bearing strength) of the rack is improved, and a rack-and-pinion mechanism with strength sufficient to withstand the torque load from motor inertia can be achieved. The part of the rack shaft where the rack is not formed only needs rigidity comparable to a conventional rack shaft because it simply slides to push the wheels for steering. The weight of the rack shaft can also be limited because it is only necessary to increase the tooth width of the rack.

It is further preferable to make the tooth width of the rack formed on the rack shaft greater than the diameter of the rack shaft in that part where the rack is not formed.

BRIEF DESCRIPTION OF THE DRAWINGS

Certain preferred embodiments of the present invention will hereinafter be described in detail, by way of example only with reference to the accompanying drawings in which:

FIG. 9A to FIG. 9C illustrate an operation of the helical gear pinion and rack;

FIG. 14 is a partial perspective view of the rack shaft in the second embodiment;

FIG. 15 is an enlarged sectional view taken along line 15—15 of FIG. 14;

FIG. 18 is a perspective view of a rack shaft shown for comparison with the rack shaft of the second embodiment;

FIG. 19 is a sectional view taken along line 19—19 of FIG. 18;

FIG. 20 illustrates how the rack tooth width shown in FIG. 19 is obtained;

FIG. 21 is a schematic view of an electric power steering apparatus according to a third preferred embodiment of the present invention;

FIG. 22 is an enlarged sectional view taken along line 22—22 of FIG. 21;

FIG. 23 is an enlarged sectional view taken along line 23—23 of FIG. 21;

DETAILED DESCRIPTION OF THE PREFERRED EMBODIMENTS

The following description is merely exemplary in nature and is in no way intended to limit the invention, its application or uses.

Figure 1:
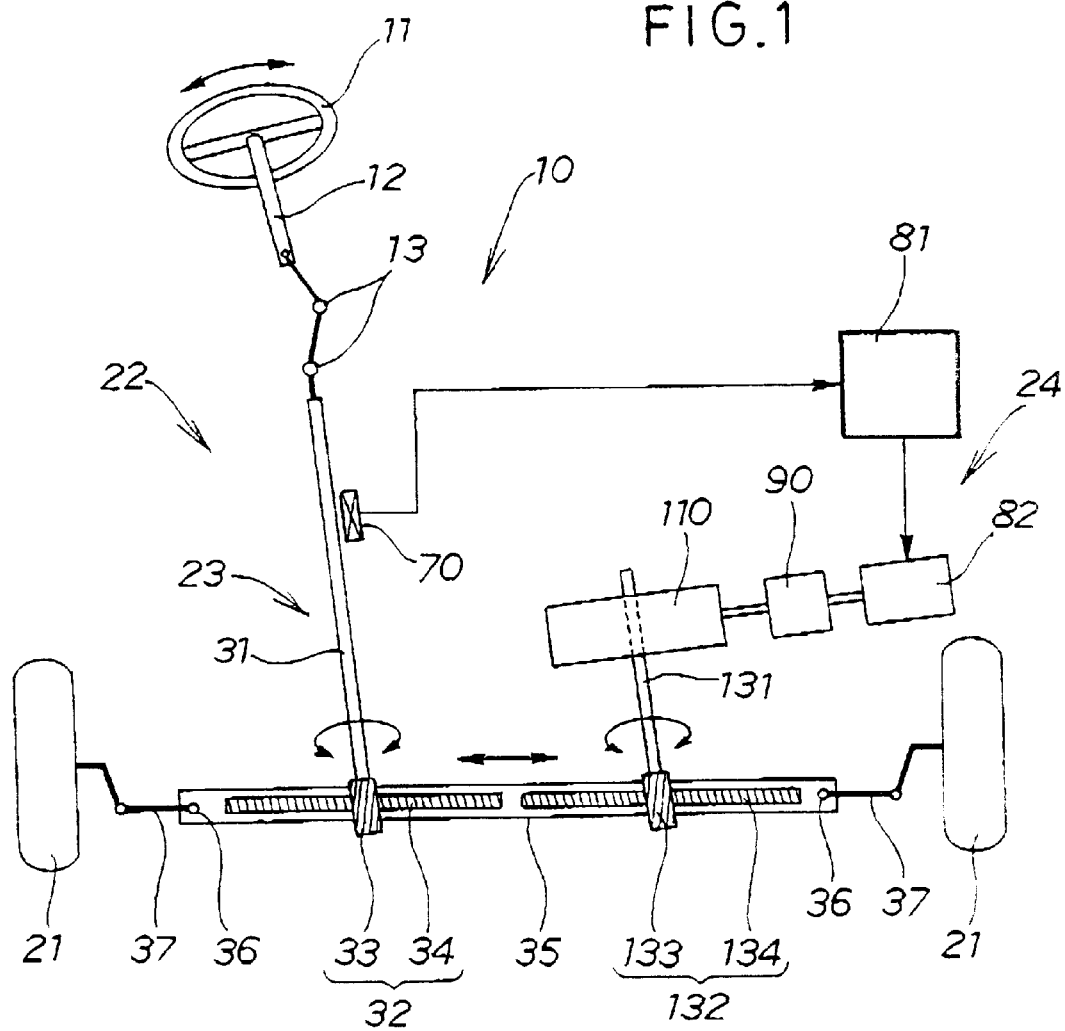
FIG. 1 is a schematic view illustrating an electric power steering apparatus according to the present invention.

Referring to FIG. 1, an electric power steering apparatus according to the present invention comprises a steering mechanism 23 provided in a steering system 22 ranging from a steering wheel 11 of a vehicle (not shown) to steered wheels 21, 21, and an assist torque mechanism 24 for feeding an assist torque to the steering mechanism 23.

In the electric power steering apparatus 10, the steering wheel 11 is linked via an intervening steering shaft 12 and universal joints 13 to an input shaft 31. A first rack-and-pinion mechanism 32 is connected to the input shaft 31. Right and left steered wheels 21 are mounted, via right and left tie rods 37, to the ends of the rack-and-pinion mechanism 32.

The first rack-and-pinion mechanism 32 comprises a first pinion 33 disposed on the input shaft 31. Rack shaft 35 having a rack 34 meshes with a pinion 33.

Assist torque mechanism 24 comprises a steering torque sensor 70 for detecting a steering torque generated in the steering system by turning the steering wheel 11, an electric motor 82 for producing an assist torque on basis of a signal detected by the steering torque sensor 70, and a second rack-and-pinion mechanism 132 operatively connected, via a torque limiter 90 and a geared reduction mechanism 110, to an electric motor 82. Steering torque sensor 70 is attached to the steering mechanism 23.

Second rack-and-pinion mechanism 132 comprises a second pinion 133 disposed on a pinion shaft 131, and a second rack 134 designed for meshing engagement with the second pinion 133. That is, the first rack 34 and second rack 134 are provided on the single rack shaft 35 in spaced relation.

In the electric power steering apparatus 10 thus arranged, steering torque produced by a driver turning the steering wheel 11 is transferred through the input shaft 31 and the first rack-and-pinion mechanism 32 to the rack shaft 35.

More specifically, the steering torque applied to the steering system 22 from the steering wheel 11 is detected by the steering torque sensor 70. Based on a detected torque signal, a controller 81 generates a control signal to cause the electric motor 82 to generate an assist torque in accordance with the steering torque. The generated assist torque is transferred to the rack shaft 35 through the torque limiter 90, geared reduction mechanism 110, pinion shaft 131 and second rack-and-pinion mechanism 132. Thus, the steered wheels 21, 21 are steered by a composite torque, that is, the steering torque produced by turning the steering wheel 11, combined with the assist torque of the electric motor 82.

Figure 2A:
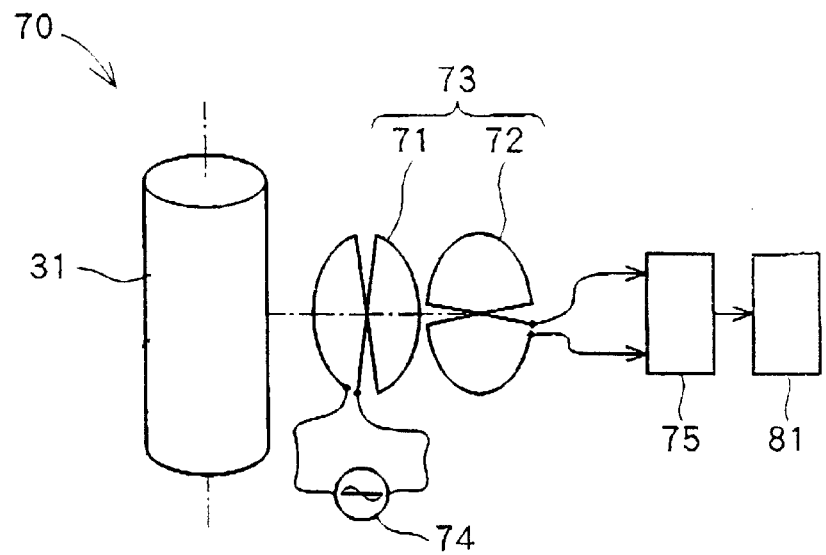
FIG. 2A and FIG. 2B describe the principle whereby a magnetostrictive torque sensor used as the steering torque sensor in FIG. 1 operates.
Figure 2B:
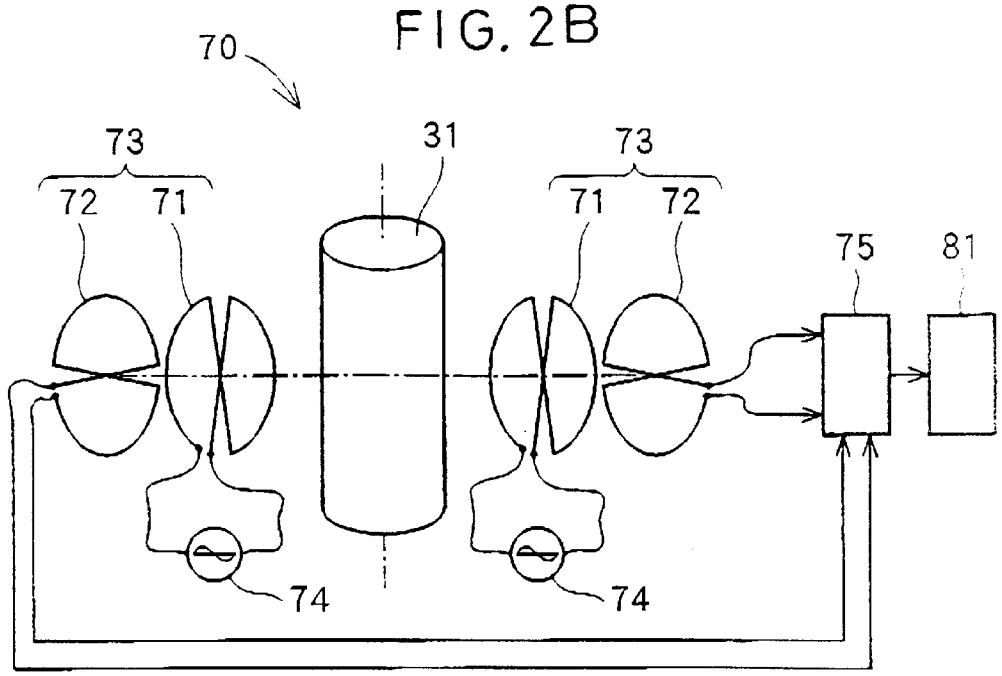

FIGS. 2A and 2B show the principle of the steering torque sensor 70 used in the electric power steering apparatus according to the present invention.

The steering torque sensor 70 used in this preferred embodiment is a magnetostrictive torque sensor that uses an electric coil to electrically detect the magnetostriction produced according to the torque acting on the input shaft 31, which has a magnetostriction characteristic similar to a steel bar. A magnetostriction type torque sensor of this type is taught, for example, in Japanese Patent Laid-Open Publication (kokai) No. HEI-6-221940. The steering torque sensor 70 is further described below.

The steering torque sensor 70 shown in FIG. 2A has an excitation coil 71 and detection coil 72, each substantially the same size and generally 8-shaped, stacked substantially coaxially and orthogonally to each other to form magnetic head 73 disposed proximally to the outside circumference of input shaft 31. In other words, the 8-shaped excitation coil 71 is disposed with respect to the outside circumference of the input shaft 31, and the figure-8 shaped detection coil 72 is stacked to the excitation coil 71 with its phase shifted 90 degrees to the excitation coil 71. The straight line part of the FIG. 8 configuration of the excitation coil 71 is substantially parallel to the outside of the input shaft 31 or substantially parallel to the axial direction of the input shaft 31. Also shown in FIG. 2A are an excitation voltage source 74 and an output voltage amplifier 75.

When a high frequency ac voltage (excitation voltage) in the range 20 kHz to 100 kHz is supplied from excitation voltage source 74 to excitation coil 71, an ac voltage of the same frequency as the excitation voltage is obtained from the detection coil 72 corresponding to the magnetostriction of input shaft 31 in response to the steering torque. Depending upon the direction of the torque acting on input shaft 31, the phase of this output voltage is either same or opposite phase to the excitation voltage. The amplitude of the output voltage is proportional to the magnitude of the torque. It is therefore possible to detect the size and direction of the torque by synchronous commutation of the output voltage referenced to the phase of the excitation voltage.

The output voltage is then amplified by output voltage amplifier 75 and supplied to controller 81 as the detection signal from steering torque sensor 70.

It should be noted that the above described configuration can be adapted to the magnetization force of input shaft 31 by simply increasing or decreasing the number of winds in excitation coil 71 and detection coil 72, assuring that the winds in the excitation and detection coils 71, 72 are mutually alternating.

The steering torque sensor 70 shown in FIG. 2B has two magnetic heads 73, each comprising a excitation coil 71 and detection coil 72. These two magnetic heads 73 are symmetrically disposed proximally to the outside circumference of input shaft 31 and to the axis of input shaft 31. In this case the output voltage amplifier 75 amplifies the difference between the detection signals from detection coils 72 to obtain a steering torque signal that is significantly unaffected by changes in environmental temperature.

By using the steering torque sensor 70 as shown in FIG. 2A or FIG. 2B in an electric power steering apparatus according to the present invention, it becomes unnecessary to divide the input shaft 31 into two parts lengthwise and connect these two parts using a torsion bar as it is when steering torque is detected using the method of a conventional electric power steering apparatus. In addition to simplifying the input shaft 31, it is therefore also possible to increase the length of the input shaft 31. Moreover, it becomes easier to set the input shaft 31 in the processing machine when processing the first pinion 33 disposed on the input shaft 31 as shown in FIG. 1. Machining precision is therefore higher and the first pinion 33 and first rack 34 can thus be made to mesh more precisely, thereby improving the power transfer efficiency of the first rack-and-pinion mechanism 32.

Figure 3:
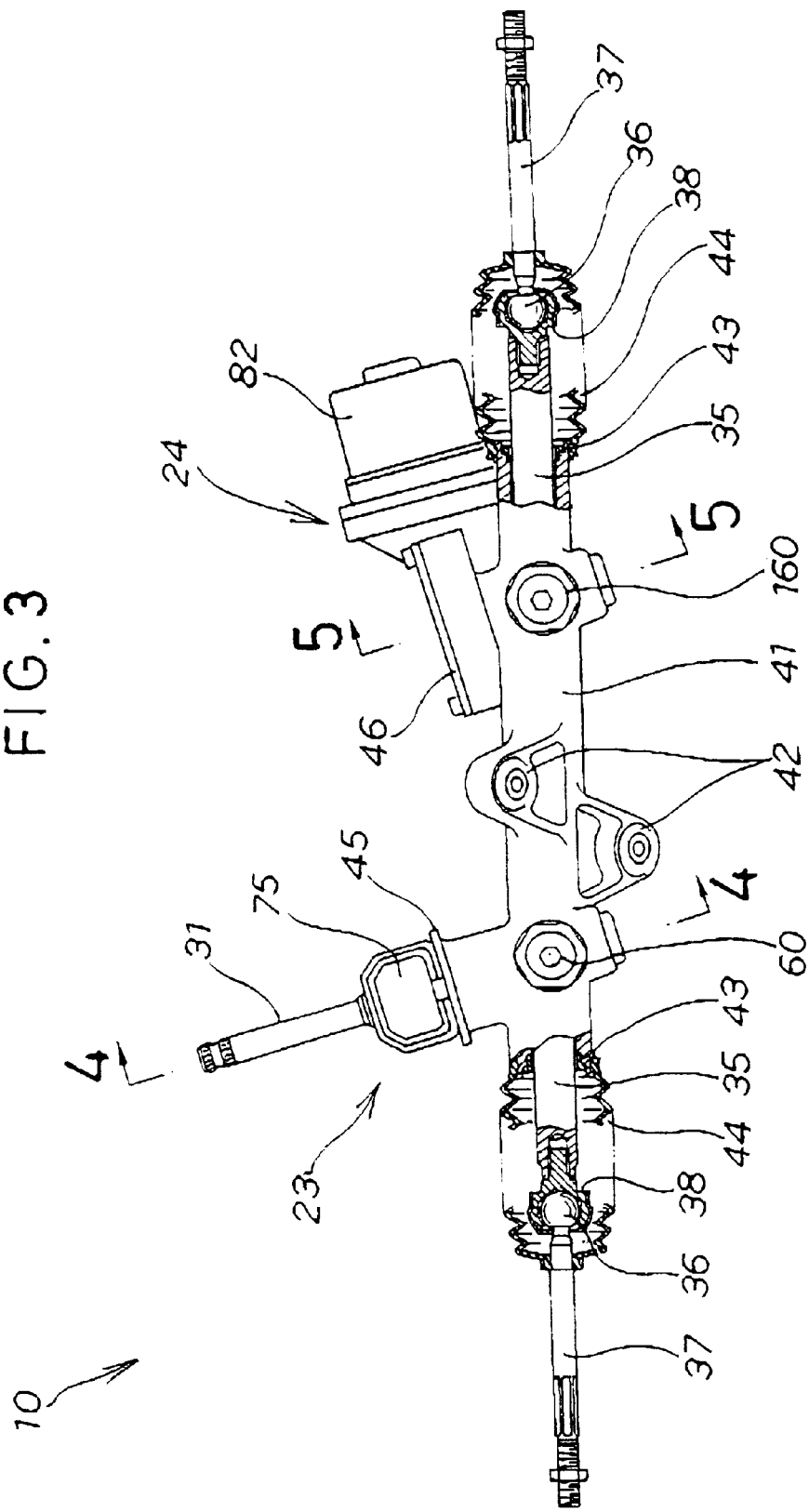
FIG. 3 is an overview of the electric power steering apparatus of FIG. 1.

FIG. 3 is an overview of the complete electric power steering apparatus according to the first embodiment of the present invention. Note that the rack shaft 35 of the electric power steering apparatus 10 is housed in a housing 41 such that it can slide along the axial direction of the rack shaft 35.

The rack shaft 35 has a ball joint 36 threaded onto each end thereof projecting in the axial direction from housing 41. Right and left tie rods 37 are connected to these ball joints 36. The housing 41 has brackets 42 for mounting the electric power steering apparatus 10 to the chassis (not shown in the figure), and a stopper 43 on each end in the axial direction.

When the rack shaft 35 slides a specific distance to the right, the rack end 38 that is the contact surface of the left ball joint 36 contacts stopper 43. When rack shaft 35 slides a specific distance to the left, the rack end 38 that is the contact surface of the right ball joint 36 contacts stopper 43. By thus limiting movement of rack shaft 35, stoppers 43 limit the maximum steering angle of the right and left steered wheels 21 (see FIG. 1). When the rack shaft 35 moves to the end of its movement range, the right and left steered wheels 21 are turned to the maximum steering angle. Note that boots 44 shown in FIG. 3 provide a dust seal.

Figure 4:
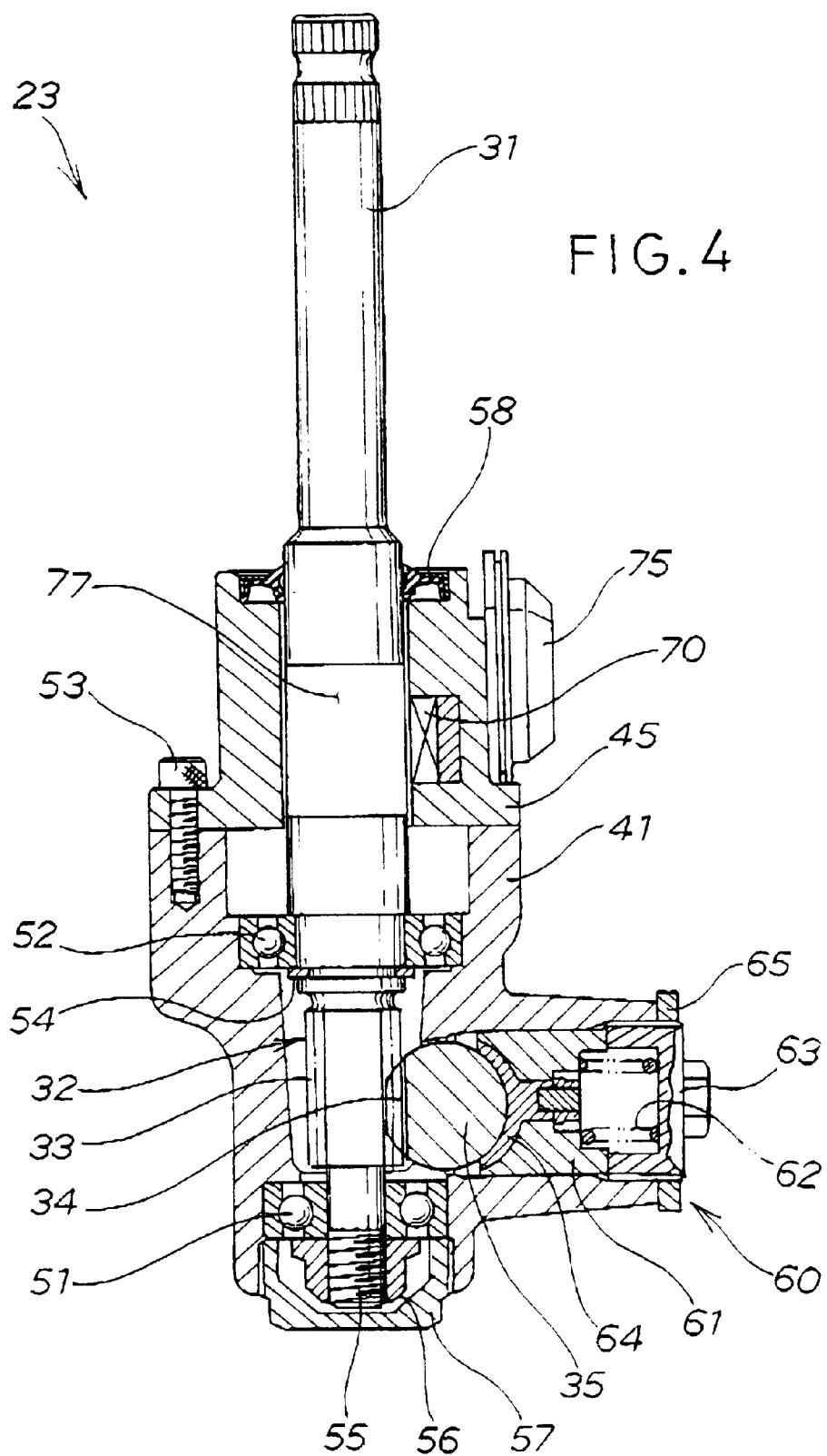
FIG. 4 is an enlarged sectional view taken along line 4—4 of FIG. 3, showing a steering mechanism.

As shown in FIG. 4, the steering mechanism 23 has the input shaft 31, first rack-and-pinion mechanism 32 and steering torque sensor 70, all housed in the housing 41. The top opening to the housing 41 is closed by a lid 45. The steering torque sensor 70 is mounted to the lid 45 in this exemplary embodiment, but can be alternatively fixed to the housing 41.

The housing 41 rotatably supports the bottom end and longitudinal middle part of input shaft 31 by means of two bearings 51 and 52. The housing 41 further has a first rack guide 60. Also shown are lid mounting bolt 53 and lock ring 54.

Threads 55 are formed on the bottom end of the input shaft 31 with the first pinion 33 integrally disposed with the input shaft 31 just above the threads 55. The top end of input shaft 31 protrudes from the top of lid 45. The input shaft 31 thus functions as a pinion shaft. Movement in the longitudinal direction of input shaft 31 is limited by threading a nut 56 onto threads 55. Also shown are a cap nut 57 and an oil seal 58.

First rack guide 60 comprises a guide member 61 contacting rack shaft 35 from the side opposite the first rack 34, and adjustment bolt 63 for urging the guide member 61 by way of compression spring 62. By appropriately setting adjustment bolt 63 in housing 41 with the first rack guide 60, compression spring 62 pushes the guide member 61 with appropriate force against the first rack 34 and thereby pushes the rack 34 against pinion 33. Note that a contact 64 pushed against and enabling rack shaft 35 to turn smoothly, and a lock nut 65, are also shown.

The steering torque sensor 70 may be arranged as follows. That is, a ferromagnetic film 77 of which the magnetostriction characteristics change according to the applied torque is disposed with a specific width around the complete circumference of the input shaft 31. Excitation and detection coils 71, 72 as shown in FIG. 2 and described in the first embodiment above are positioned relative to the ferromagnetic film 77. When torque acts on the ferromagnetic film 77 by way of the input shaft 31, detection coil 72 electrically detects magnetostriction of the ferromagnetic film 77 according to the torque. An exemplary ferromagnetic film 77 is a ferromagnetic film formed by vapor deposition of a Ni—Fe alloy film on input shaft 31.

Figure 5:
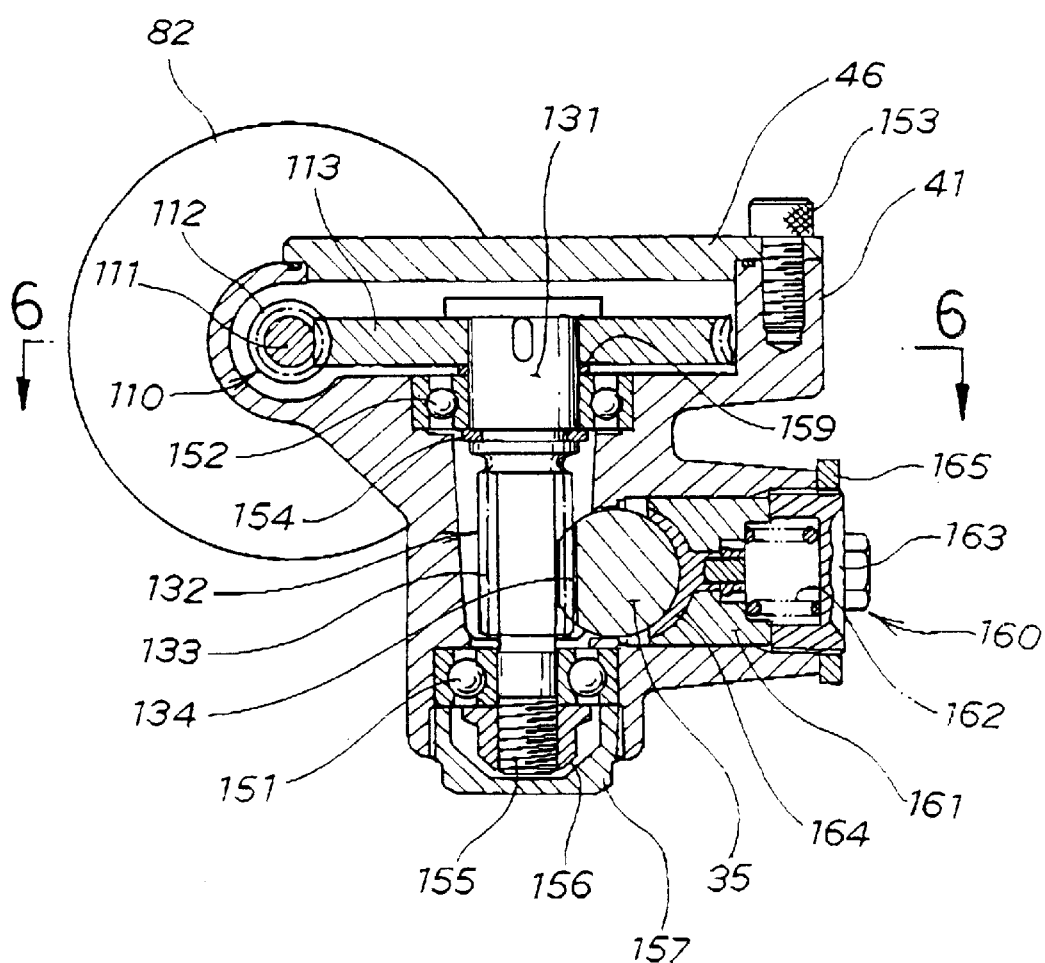
FIG. 5 is an enlarged sectional view taken along line 5—5 of FIG. 3, showing an assist torque mechanism.

Reference is now made to FIG. 5 illustrating the assist torque mechanism 24 in section. The assist torque mechanism 24 includes the housing 41 with the torque limiter 90 (see FIG. 1), geared reduction mechanism 110, pinion shaft 131, and second rack-and-pinion mechanism 132 housed therein. Top opening of the housing 41 is closed by a lid 46.

Housing 41 rotatably supports the top and bottom parts of pinion shaft 131 by means of two intervening bearings 151, 152. The housing 41 also has a second rack guide 160. Note that a lid mounting bolt 153 and a snap ring 154 are also shown.

Pinion shaft 131 has a thread 155 formed on the end thereof with a second pinion 133 formed integrally thereto at the bottom end above the thread 155. The second rack 134 is formed on the rack shaft 35. Movement in the axial direction of the pinion shaft 131 is limited by screwing nut 156 onto the thread 155. Note that a cap nut 157 and a spacer 159 are also shown in the figure.

Second rack guide 160 has a guide member 161 contacting the rack shaft 35 from the side opposite the second rack 134, and an adjustment bolt 163 for pushing against the guide member 161 by means of an intervening compression spring 162. By adjusting the adjustment bolt 163 threaded into the housing 41 to push on the guide member 161 by means of the compression spring 162 with an appropriate pressure, the second rack guide 160 keeps the second rack 134 pressed to the second pinion 133. Note that a contact 164 slidably supporting the back of the rack shaft 35, and a lock nut 165, are also shown in the Figure.

Figure 6:
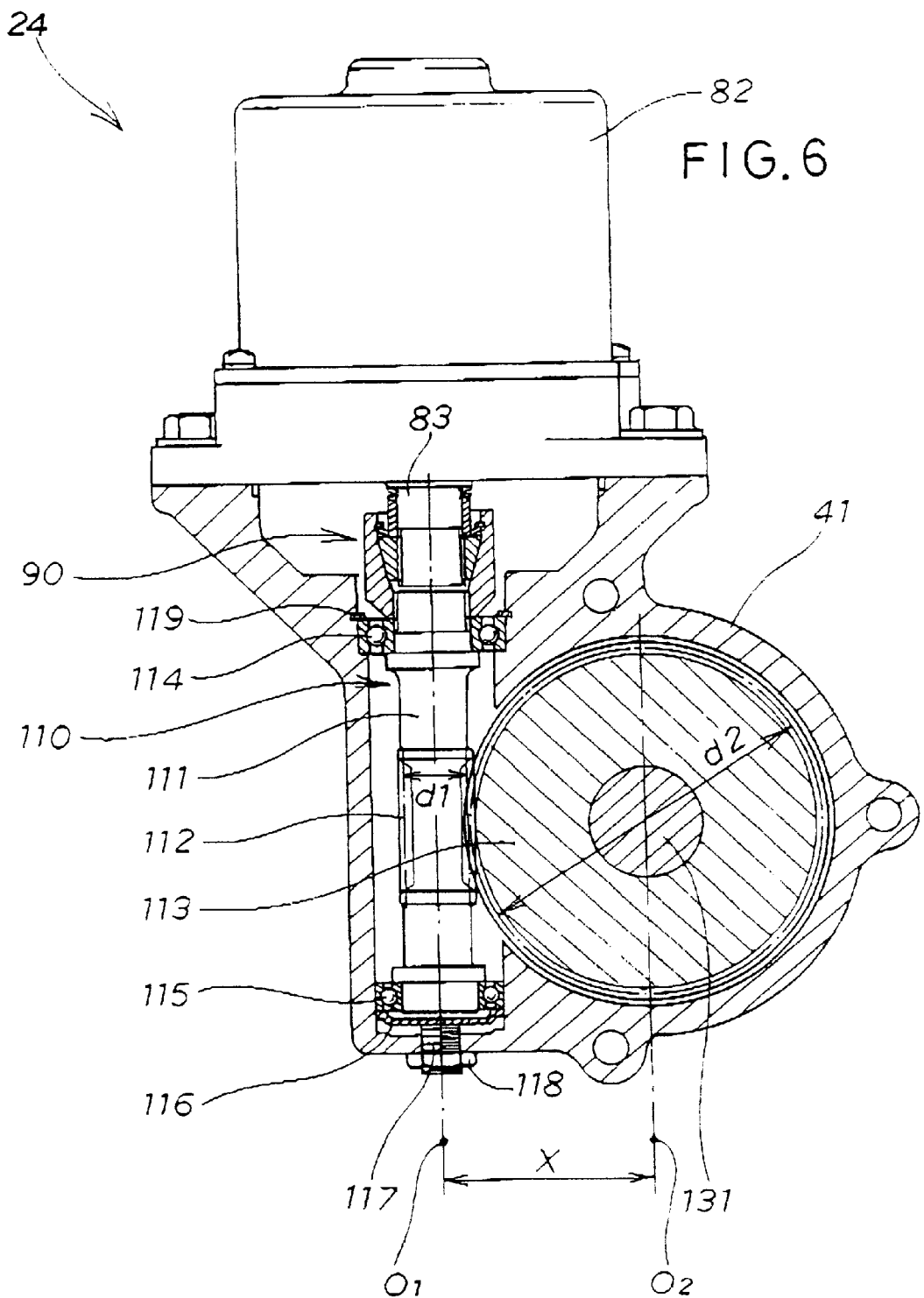
FIG. 6 is an enlarged sectional view taken along line 6—6 of FIG. 5.

Reference is made next to FIG. 6 showing the relative positions of the pinion shaft 131, motor 82, torque limiter 90 and geared reduction mechanism 110.

Motor 82 is mounted to the housing 41. The output shaft 83 of the motor 82 extends into the housing 41.

Geared reduction mechanism 110 is a torque transfer means for transferring an assist torque produced by the motor 82 to the pinion shaft 131. It is a worm gear mechanism comprising a combination of driver and driven gears. The geared reduction mechanism 110 comprises a transfer shaft 111 connected by means of the torque limiter 90 to the output shaft 83 of the motor 82; a worm (driver gear) 112 formed on the transfer shaft 111; and a worm wheel (driven gear) 113 connected to the pinion shaft 131 and engaging the worm 112. The assist torque from the motor 82 is transferred through the pinion shaft 131 to the second rack-and-pinion mechanism 132 (see FIG. 1).

A feature of our invention is that a coating layer of a low friction material is imparted by a surface processing technique to the tooth faces of worm 112 and/or the tooth faces of worm wheel 113. A coating layer of a low friction material can be imparted by, for example, coating the tooth faces with the low friction material or by impregnating the surfaces with a low friction material. Power transfer efficiency is improved by lowering to a specific value the friction coefficient of the sliding surfaces between the tooth faces of worm 112 and the tooth faces of worm wheel 113.

Exemplary low friction materials include polytetrafluoroethylene (PTFE), which is sold under the name Teflon®. Fluoropolymers typically have a very low coefficient of friction, and are therefore well suited as low friction materials.

Surface processing techniques for imparting a low coefficient of friction coating using these low friction materials include the first and second surface processing methods further described below.

In the first surface processing method the worm 112 and worm wheel 113 are made from carbon steel for machine structures, including JIS-G-4051 carbon steel. Electroless nickel and PTFE are deposited to the tooth surfaces of worm 112 and worm wheel 113 in a specific processing solution so that there is a uniform distribution of 10% to 30% PTFE by volume in the coating. The electroless nickel and PTFE coating is then strongly bonded to the surfaces of the teeth using a heat process (sintering at approximately 400° C.). Coating thickness is 5 μm to 20 μm. NIFGRIP™ from Ulvac Techno, Ltd., is one example of a product manufactured using this first surface processing method.

In the second surface processing method the worm 112 and worn wheel 113 are also made from carbon steel for machine structures, including JIS-G-4051 carbon steel. A porous film of nickel and phosphorus is then formed on the tooth surfaces of worm 112 and worm wheel 112 using an electroless coating method. This porous film is then impregnated with PTFE and heat processed (sintering at approximately 400° C.) to strongly bond the coating to the teeth surfaces. The coating bonded to the tooth surface is a porous film of granularly precipitated nickel and phosphorus impregnated with PTFE, and has a thickness of 5 μm to 20 μm. NEDOX™ from Ulvac Techno, Ltd., is one example of a product manufactured using this second surface processing method. This porous film is then impregnated with PTFE and heat processed (sintering at approximately 400° C.) to strongly bond the coating to the teeth surfaces. The coating bonded to the tooth surface is a porous film of granularly precipitated nickel and phosphorus impregnated with PTFE, and has a thickness of 5 μm to 20 μm. NEDOX™ from Ulvac Techno, Ltd., s one example of a product manufactured using this second surface processing method.

The transfer shaft 111 is disposed coaxially to output shaft 83, and is rotatably supported on housing 41 by way of two intervening bearings 114, 115. The first bearing 114 positioned near the output shaft 83 is mounted immovably with respect to the axial direction of transfer shaft 111 on housing 41. The second bearing 115 positioned far from output shaft 83 is also mounted immovably with respect to the axial direction of transfer shaft 111 on housing 41.

The second bearing 115 is urged to output shaft 83 by adjustment bolt 117 by way of intervening light leaf spring 116. By thus adjusting the position of second bearing 115 by means of adjustment bolt 117, transfer shaft 111 can be adjusted to remove any play in the axial direction thereof.

By further adjusting the axial displacement of worm 112, the worm 112 and worm wheel 113 can be adjusted to remove any play while maintaining suitable friction when worm 112 and worm wheel 113 mesh.

Thermal expansion in the axial direction of transfer shaft 111 can also be absorbed by the resilience of leaf spring 116.

Note that lock nut 118 and lock ring 119 are also shown in the Figure.

The present invention is characterized by causing the teeth of worm 112 and the teeth of worm wheel 113 to mesh with no backlash. The means whereby backlash is eliminated is achieved, for example, by some combination of the following four factors.

(1) Manufacturing worm 112 from metal and coating the tooth surfaces thereof with a low friction coefficient material.

(2) Using a resin or plastic worm wheel 113.

(3) Setting the distance X from center $O_1$ of worm 112 to center $O_2$ of worm wheel 113 to a specific theoretical value (reference value).

(4) Setting the reference pitch circle diameter $d_1$ of worm 112 or the reference pitch circle diameter $d_2$ of worm wheel 113 slightly greater than a specific theoretical value (reference value).

When reduction mechanism 110 is assembled, the teeth faces of worm 112 and worm wheel 113 mesh with pressure corresponding to the difference between reference pitch circle diameter $d_1$ and $d_2$ applied therebetween. This eliminates backlash (mesh gap) between the teeth of worm 112 and worm wheel 113, and thus eliminates play. Because there is no play, torque shock from the inertia of motor 82 is not transferred from the teeth faces of worm 112 to the teeth faces of worm wheel 113. The durability of reduction mechanism 110 is thus further improved.

However, when backlash disappears, meshing resistance (friction) between the teeth faces of worm 112 and worm wheel 113 normally increases. This problem is resolved by coating the teeth faces of worm 112 with a coating made from a low friction coefficient material. This low friction coefficient material reduces the friction coefficient of the sliding faces of the teeth of worm 112 and worm wheel 113. It is therefore possible to increase power transfer efficiency while maintaining appropriate friction between the meshing teeth surfaces of gears 112 and 113 even though meshing of worm 112 and worm wheel 113 is adjusted to eliminate any play.

Figure 7:
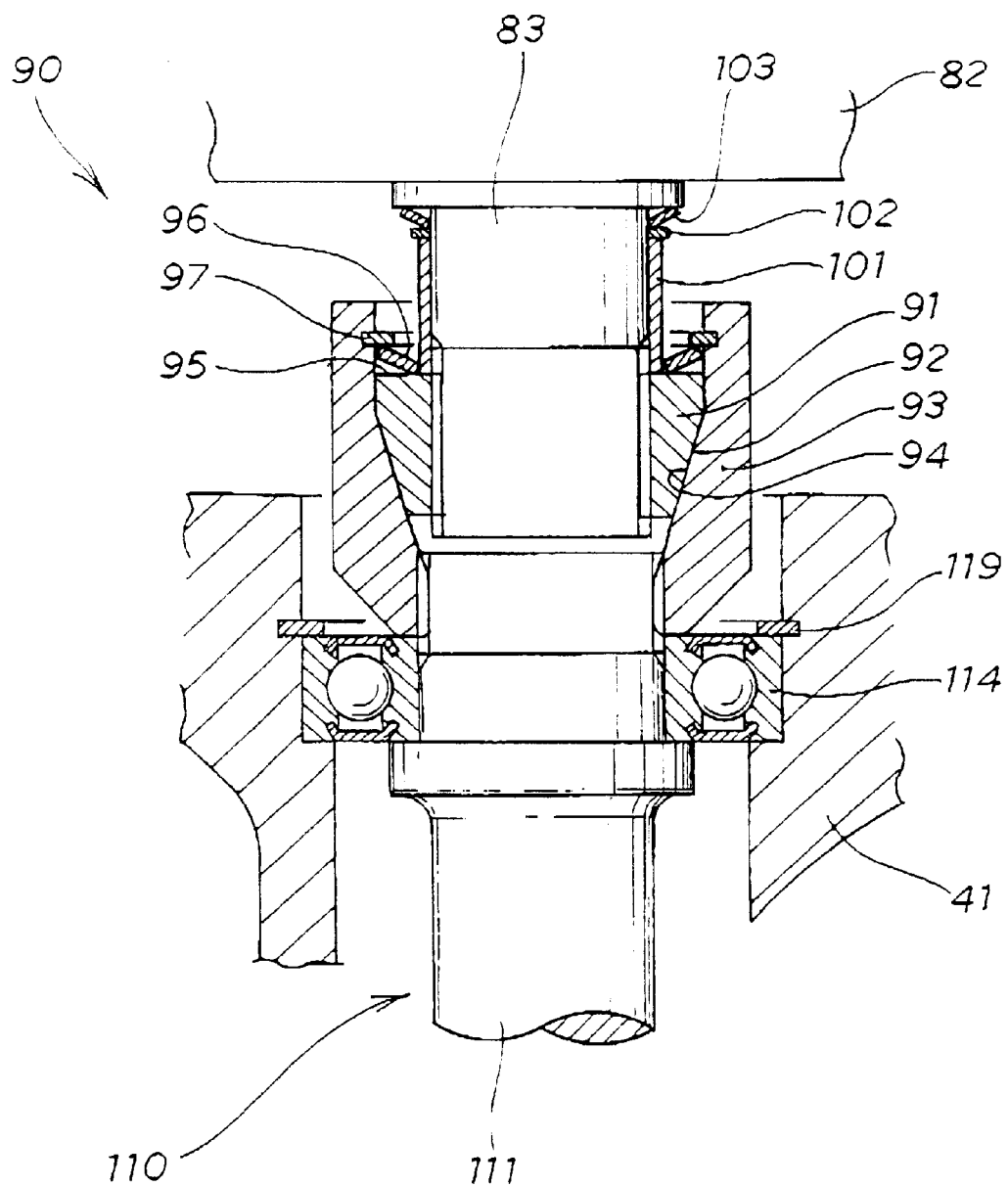
FIG. 7 is an enlarged sectional view of a torque limiter shown in FIG. 6.

FIG. 7 shows torque limiter 90. A further feature of the present invention is the intercession of torque limiter 90 between motor 82 and reduction mechanism 110. This torque limiter 90 is a torque limiting mechanism having an inner member 91 serration connected to output shaft 83 of motor 82 fit in a cylindrical outer member 93, which is serration connected to transfer shaft The inner member 91 is a male member of which the outside surface 92 is tapered toward the end of transfer shaft 111. The outer member 93 is a female member of which the inside surface 94 is tapered to match and fit outside surface 92 of inner member 91. The torque limiter 90 is assembled by fitting tapered outside surface 92 in tapered inside surface 94, urging the back end 95 of inner member 91 with a belleville spring 96, and locking it in place with lock ring 97. Note that spacer 101, washer 102, and Belleville spring 103 are also shown.

Outside surface 92 and inside surface 94 are engaged with a specific friction force therebetween as a result of the resilience of belleville spring 96 pushing inner member 91 so that the outside surface 92 of inner member 91 is pushed against the inside surface 94 of outer member 93. Because the torque limiter 90 is thus comprised, outside surface 92 and inside surface 94 will slip against each other if torque exceeding the specific friction force acts on output shaft 83. It is therefore possible to limit the assist torque transferred from motor 82 to reduction mechanism 110. In other words, it is possible to eliminate over-torquing. Excessive torque therefore does not occur at the motor 82, and excessive torque is not transferred to the load side.

Furthermore, because the inner member 91 and outer member 93 are taper fit, assembly precision is extremely high and center alignment is easy.

Furthermore, because a small torque limiter 90 intercedes between reduction mechanism 110 and the relatively high speed motor 82, enclosure inside the housing 41 is simple.

FIGS. 8A to 8D show a second rack-and-pinion mechanism according to the first embodiment of the present invention. Line L1 is the center axis of the second pinion; line L2 is the center axis of the rack shaft; and line L3 is a line perpendicular to the tooth surface of the second rack. It will be noted that in this exemplary embodiment center axis L1 of second pinion 133 is assumed to be orthogonal to the center axis L2 of the rack shaft 35.

Figure 8A:
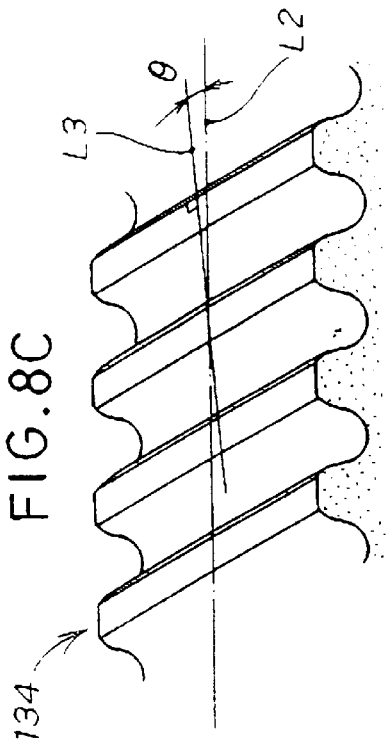
FIG. 8A to FIG. 8D illustrate a second rack-and-pinion mechanism wherein the pinion and rack are helical gears.
Figure 8B:
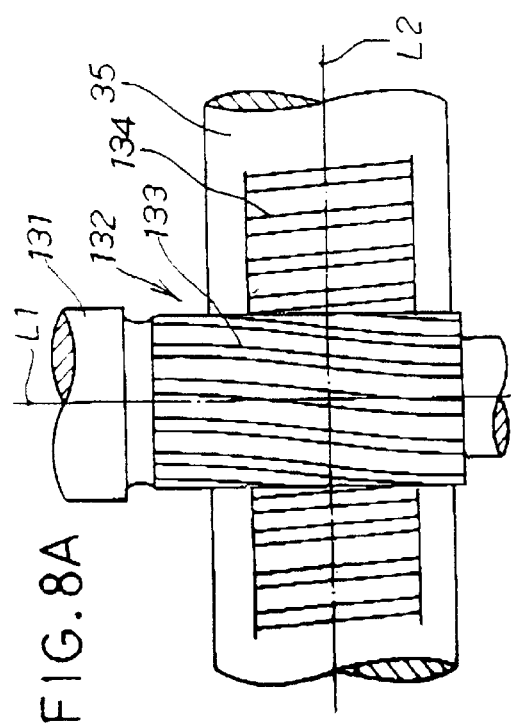

Second pinion 133 and second rack 134 of the second rack-and-pinion mechanism 132 shown in FIG. 8A are helical gears. As shown in FIG. 8B, helical gears are cylindrical gears in which the tooth trace 133c, which is the line of intersection between the tooth surface 133b and the circumferential surface of cylinder 133a (the reference pitch surface) is a helix 133d with a specific helix angle θ. Note that helix angle θ is the angle between the helix 33d and the root diameter line 133e (a line orthogonal to the pitch diameter line) of cylinder 133a.

Figure 8C:
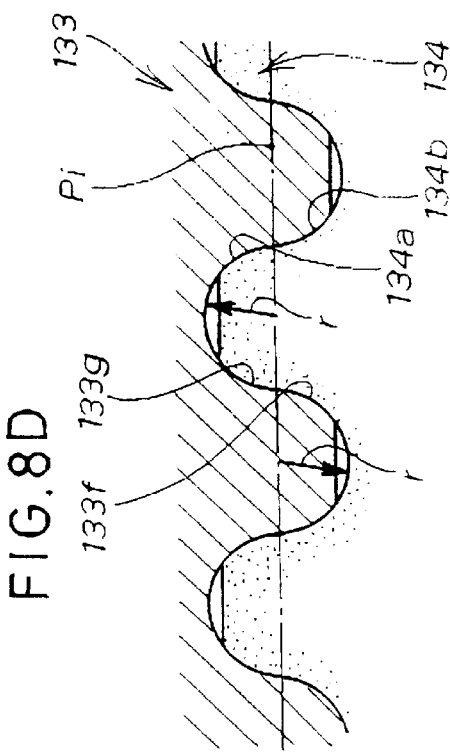

FIG. 8C is an enlarged perspective view of the helical gear forming second rack 134. Note that the helix angle is the same as the helix angle θ of the helical gear forming the second pinion 133.

A further feature of our invention is that the helix angle θ of the helical gears forming the second pinion 133 and second rack 134 is set within a range not exceeding the friction angle of the helical gears. The reason for this is described further below.

Figure 8D:
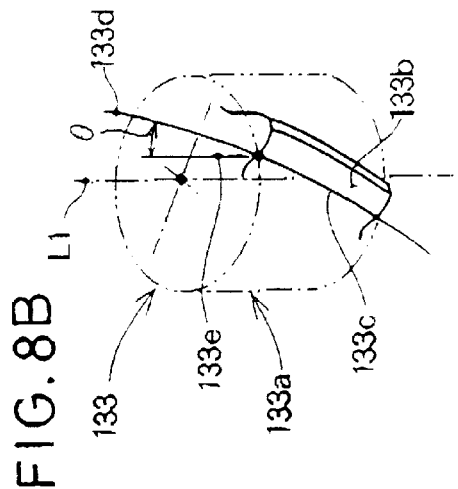

FIG. 8D is an enlarged section view of the tooth profile of the helical gears forming the second pinion 133 and second rack 134. Note that the tooth profile of these helical gears is a circular arc.

It will be noted that gears with a circular arc tooth profile are known in the literature, including "New gears and their applications: circular arc tooth profile gears" (Machine design, Vol. 26, No. 3, pp. 47 to 51. Nikkan Kogyo Shinbunsha, March 1982). Gears with a circular arc tooth profile are further described below.

That is, circular arc tooth profile gears are gears in which the addendum in one of a pair of gears is on an arc of which the center is substantially reference pitch line Pi, and the dedendum of the other gear in the pair is on an arc of which the center is substantially reference pitch line Pi. Gears with a circular arc tooth profile can have a symmetrical or asymmetrical tooth profile.

Note that the dedendum is the part of the tooth surface between reference pitch line Pi and the bottom land, while the addendum is the part of the tooth surface between the reference pitch line Pi and the crown.

Referring to the second pinion 133 in FIG. 8D, a symmetrical circular arc tooth profile gear means that the arc of the dedendum 133g and the arc of the addendum, or more specifically that the dedendum 133g and addendum 133f are point symmetrical to the reference pitch line Pi. Exemplary of such gears are the type of 3 Novikov gear, and Sym MarC® gears from Hitachi Seisakusho. Note that in FIG. 8D r is the radius of the arcs.

The symmetrical circular arc tooth profile of the second rack 134 is identical to that of the second pinion 133, and addendum 134a and dedendum 134b are formed on arcs point symmetrical to reference pitch line Pi.

In an asymmetrical circular arc tooth profile gear pair the addendum and dedendum of the tooth profile are not symmetrical to the reference pitch line Pi. More specifically, only the arc of the addendum is centered on reference pitch line Pi in one gear, and only the arc of the dedendum is centered on reference pitch line Pi in the other gear of the pair. Exemplary of an asymmetrical circular arc tooth profile gear are the type 1 and type 2 Novikov gears, and CirCarC® gears manufactured by Associated Electrical Industries of Britain.

The helical gears used in the present invention are preferably symmetrical circular arc tooth profile gears.

With the transverse tooth profile of an involute tooth form, meshing (contact) occurs between convex tooth surfaces. In the present invention, however, the tooth profile of the helical gear is a circular arc. With the transverse tooth profile of a circular arc tooth form, meshing (contact) occurs between convex and concave tooth surfaces. Because the radius of relative curvature in the tooth trace direction is large, the area of the line of contact is large when a load is applied. In general, compared with involute gears, the surface fatigue strength of circular arc gears is 6 to 7 times greater, bending strength is 1.5 to 1.6 times greater, and bending fatigue strength is 1.5 to 1.6 times greater.

Furthermore, because of the circular arc shape, dedendums 133f and 134b are rounded compared with the tooth profile of a conventional involute tooth gear. It is therefore possible to reduce the notch effect on impact and fatigue strength, and it is therefore possible to further improve the bending strength of the tooth part.

By using a circular arc helical gear for the second pinion 133 and second rack 134 it is possible to further increase gear strength and achieve the following benefits.

For example, when the right and left steered wheels are turned to the maximum steering angle, that is, when the rack shaft in FIG. 3 has moved to the end of its range of movement, the left ball joint 36 contacts the stopper 43, the right ball joint 36 contacts the stopper 43, and movement of the rack shaft 35 stops immediately. At this time torque significantly greater than that produced during normal steering acts on the second pinion 133 (see FIG. 1) and second rack 134. The resultant stronger pinion 133 and rack 134 can, however, sufficiently withstand this high torque.

Furthermore, because the second pinion 133 and second rack 134 have a circular arc tooth profile, meshing of the gear pair results in contact between concave and convex tooth surfaces, and the contact area when the gears mesh is thus greater than that achieved with a conventional involute tooth profile. Because the contact pressure is lower (contact pressure drops to approximately ⅙ that of an involute tooth profile), the tooth surfaces slide more smoothly. Moreover, circular arc tooth profile gears are also known to contact quite similarly to sliding bearings An advantage of a sliding bearing is that contact is uniform. It is possible to apply this advantage directly to the contact of a circular arc tooth profile gear. Friction between sliding tooth faces can therefore be significantly reduced.

Referring to FIG. 5, when a high torque load due to motor inertia acts on the second rack-and-pinion mechanism 132, a strong force in the direction perpendicular to the axis acts in conjunction therewith on the rack shaft 35. So that this force does not cause rack shaft 35 to move back, the friction force of the sliding tooth surfaces drops even though a second adjustment bolt 163 pushes directly against the back of second guide member 161. It is therefore possible to increase the power transfer efficiency of the second rack-and-pinion mechanism 132 while still maintaining a feeling of good steering control of steering wheel 11 (see FIG. 1).

Moreover, because the friction force of the sliding tooth surfaces is low, it is possible to transfer assist torque from motor 82 to the rack shaft 35 by the second pinion 133 with good efficiency even when steering under high load conditions (such as when turning the wheels while the vehicle is stopped). Less assist torque is therefore needed compared with conventional involute gears, and an electric power steering apparatus with low power consumption can therefore be provided.

FIG. 9A shows the second rack 134 being moved to the left in the figure by turning the second pinion 133. When the right and left steered wheels are turned the maximum steering angle to the right, that is, when rack shaft 35 moves to the end of its range of movement, the right ball joint 36 contacts the stopper 43 and the second rack 134 stops movement. The torque at this time is impact torque, and is thus the maximum torque, greater than torque during normal steering.

FIG. 9B illustrates the state when the tooth surface of the second rack 134 is pushed to the left in the figure by the tooth surface of the second pinion 133. FIG. 9C shows the tooth surface of the second rack 134 as a right triangle with slope D.

In FIG. 9B and FIG. 9C the angle of inclination of slope D is $\theta$, that is, the same as the helix angle $\theta$ of the helical gears. The work force of tooth B of the second pinion 133 pushing against slope D is $W_0$, which is comparable to the force (torque of second pinion 133) acting in the circumferential direction on the pitch circle of the second pinion 133. Force $W_0$ therefore works perpendicularly to line AB.

When the second rack 134 stopped at the end of its movement range is pushed further by the second pinion 133, tooth E tries to slip and move along slope D in the direction of point A. The direct pressure working between slope D and tooth E (the force working perpendicularly to the tooth surface), that is, direct pressure $W_1$ working between the tooth surface of the second pinion 133 and the tooth surface of the second rack 134, is obtained from equation (1).

$$W_1 = W_0 \times \cos \theta \tag{1}$$

The force working parallel to slope D (that is, force $W_2$ working parallel to the tooth surface of the second rack 134) is obtained from equation (2).

$$W_2 = W_0 \times \sin\theta \quad (2)$$

Force $P_0$ parallel to line AB is also needed so that tooth E does not slip and move towards point A as a result of force $W_2$. This support force $P_0$ is the thrust working on the second pinion 133, and the direction of force $P_0$ is perpendicular to the direction of force $W_0$. The partial forces of supporting force $P_0$ are partial force $P_1$ perpendicular to slope D, and partial force $P_2$ parallel to slope D. Partial forces $P_1$ and $P_2$ can be calculated using equations (3) and (4).

$$P_1 = P_0 \times \sin\theta \quad (3)$$

$$P_2 = P_0 \times \cos\theta \quad (4)$$

The sum of the force components perpendicular to slope D, that is, composite direct pressure R, is the sum of direct pressure $W_1$ and partial force $P_1$ as shown in equation (5).

$$R = W_1 + P_1 \quad (5)$$

If we let F be the maximum friction force between the tooth surface of the second pinion 133 and the tooth surface of the second rack 134, the magnitude of this maximum friction force F is proportional to composite direct pressure R as shown in equation (6).

$$F = \mu \times R \quad (6)$$

where $\mu$ is the coefficient of friction between the tooth surfaces of the second pinion 133 and second rack 134, which are helical gears as noted above. If the friction angle of the helical gear corresponding to friction coefficient $\mu$ is $\rho$, then friction coefficient $\mu$ can be obtained from equation (7).

$$\mu = \tan\rho \quad (7)$$

Friction force F works in the direction opposite force $W_2$ because tooth E wants to slip along slope D and move to point A as a result of force $W_2$.

The relationship between the three forces F, $W_2$, and $P_2$ parallel to slope D is shown in equation (8).

$$P_2 = W_2 - F \quad (8)$$

Equation (9) is derived by substituting equations (1) to (6) in equation (8).

$$P_0 = \cos\theta = W_0 \times \sin\theta - \mu \times R = W_0 \times \sin\theta - \mu(W_1 - P_1) = W_0 \times \sin\theta - \mu(W_0 \times \cos\theta + P_0 \times \sin\theta) = W_0 \times \sin\theta - \mu \times W_0 \times \cos\theta - \mu \times P_0 \times \sin\theta \quad (9)$$

which can be simplified as equations (10) and (11).

$$P_0 \times (\cos\theta + \mu \times \sin\theta) = W_0(\sin\theta - \mu \times \cos\theta) \quad (10)$$

$$P_0 = W_0(\sin\theta - \mu \times \cos\theta)/(\cos\theta + \mu \times \sin\theta) \quad (11)$$

Equation (12) is obtained by substituting equation (7) into equation (11).

$$P_0 = W_0 \times [(\sin\theta - \tan\rho \times \cos\theta)/(\cos\theta + \tan\rho \times \sin\theta)]$$

$$= W_0 \times [(\sin\theta - (\sin\rho/\cos\rho) \times \cos\theta)/(\cos\theta + (\sin\rho/\cos\rho) \times \sin\theta)]$$

$$= W_0 \times [(\sin\theta \times \cos\rho - \cos\theta \times \sin\rho)/(\cos\theta \times \cos\rho + \sin\theta \times \sin\rho)] = W_0 \times [\sin(\theta-\rho)/\cos(\theta-\rho)] = W_0 \times \tan(\theta-\rho) \quad (12)$$

As will be known from equation (12), $P_0 = 0$ when $\theta = \rho$. When $\theta < \rho$, $P_0 < 0$. Therefore, thrust does not act on the second pinion 133, that is, force $P_0$ does not work, even if a high torque acts on the second pinion 133 when the second rack 134 is stopped. Helix angle $\theta$ of the helical gear is therefore set in the range not exceeding helical gear friction angle $\rho$, that is, in the range $0° < \theta <= \rho$.

When the second rack 134 is not stopped at either the right or left end of its movement range, that is, during most normal steering situations, and the second rack 134 is driven by the second pinion 133 to the right or left, the force with which tooth E of the second pinion 133 pushes on slope D is less than force $W_0$. The thrust working on pinion 33 corresponds to this weak force.

It is thus possible to limit the thrust acting on the second pinion 133 to a very low level.

An alternative embodiment in which the pinion shaft 131 is connected skewed to the second rack 134 is described next with reference to FIGS. 10A and 10B.

Figure 10A:
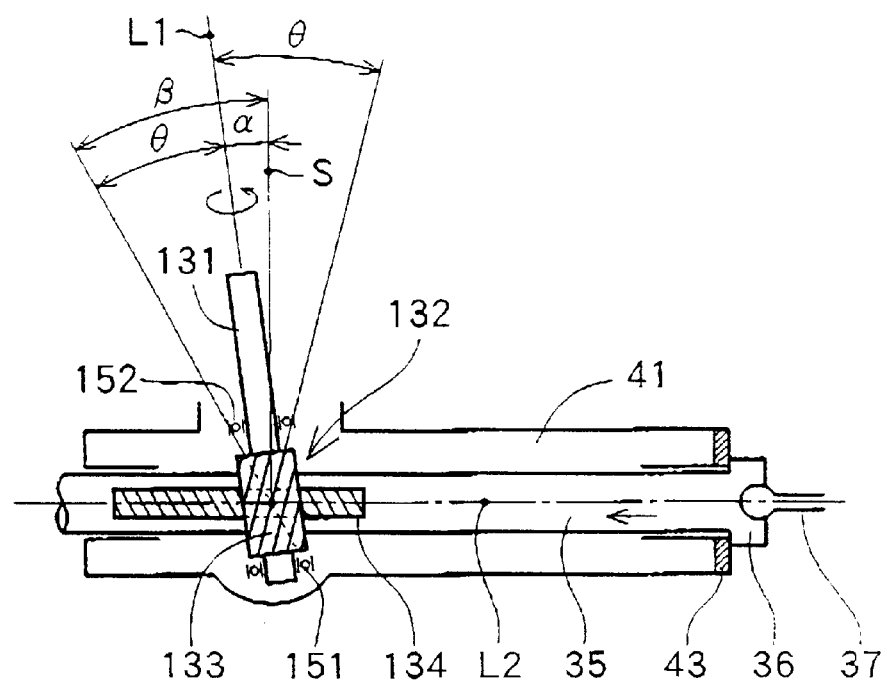
FIG. 10A and FIG. 10B show a variation of the rack-and-pinion mechanism of FIG. 9A.
Figure 10B:
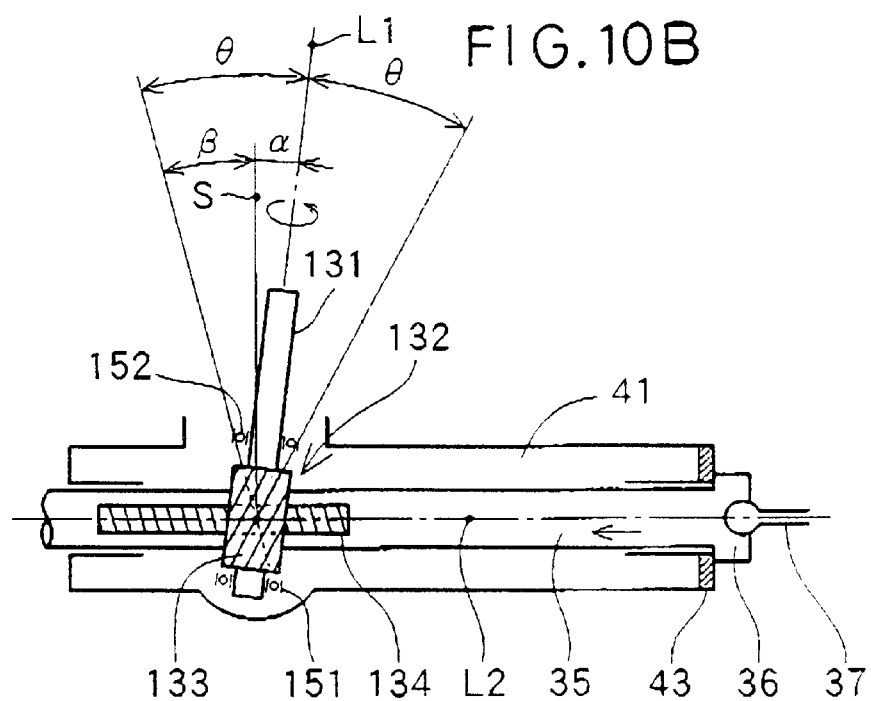

FIG. 10A shows a configuration in which the pinion shaft 131 is skewed to the left by skew angle $\alpha$ from reference line S perpendicular to the center axis L2 of the rack shaft 35. FIG. 10B shows a similar configuration in which the pinion shaft 131 is skewed to the right by skew angle $\alpha$ from reference line S.

In this example the second helical gear rack 134 has helix angle $\beta$. The helix angle of the second rack 134 in FIG. 10A is $\beta = \theta + \alpha + \alpha$. The helix angle of the rack 134 in FIG. 10B is $\beta = \theta - \alpha$. The helix angle $\theta$ of the second pinion 133 is constant regardless of the skew angle $\alpha$ of the pinion shaft 131. By thus maintaining a constant helix angle $\theta$ in the pinion 133, thrust $P_0$ working on the pinion 133 is also constant, and can be obtained from equation (12) above.

As described above, helix angle $\theta$ of the second pinion 133 is in the range not exceeding helical gear friction angle $\rho$, that is, in the range $0° < \theta \leq \rho$. Therefore, regardless of the pinion shaft skew angle $\alpha$, thrust does not act on the pinion 133, that is, force $P_0$ does not work, even if a high torque acts on the pinion 133 when the rack shaft movement stops.

To summarize the above, by using helical gears for the second pinion 133 and second rack 134, it is possible to transfer relatively high torque compared with a spur gear. As a result, a relatively small second rack-and-pinion mechanism 132 can be achieved.

Moreover, because the helix angle $\theta$ of the second pinion 133, which is a helical gear, is less than the helical gear friction angle $\rho$, the thrust acting on the pinion 33 during normal steering situations, that is, when the second rack 134 is not stopped at either right or left end, can be low. As a result, low thrust acts on the pinion shaft 131 in FIG. 9A, FIG. 10A, and FIG. 10B, and the thrust acting on bearings 151, 152 supporting the pinion shaft 131 and geared reduction mechanism 110 linked to the pinion shaft 131 (see FIG. 5), is also low. Therefore, even though helical gears are used, it is not necessary to increase the strength of the pinion shaft 131, bearings 151, 152, or geared reduction mechanism 110, and these components can therefore be made compact and low cost.

Figure 11:
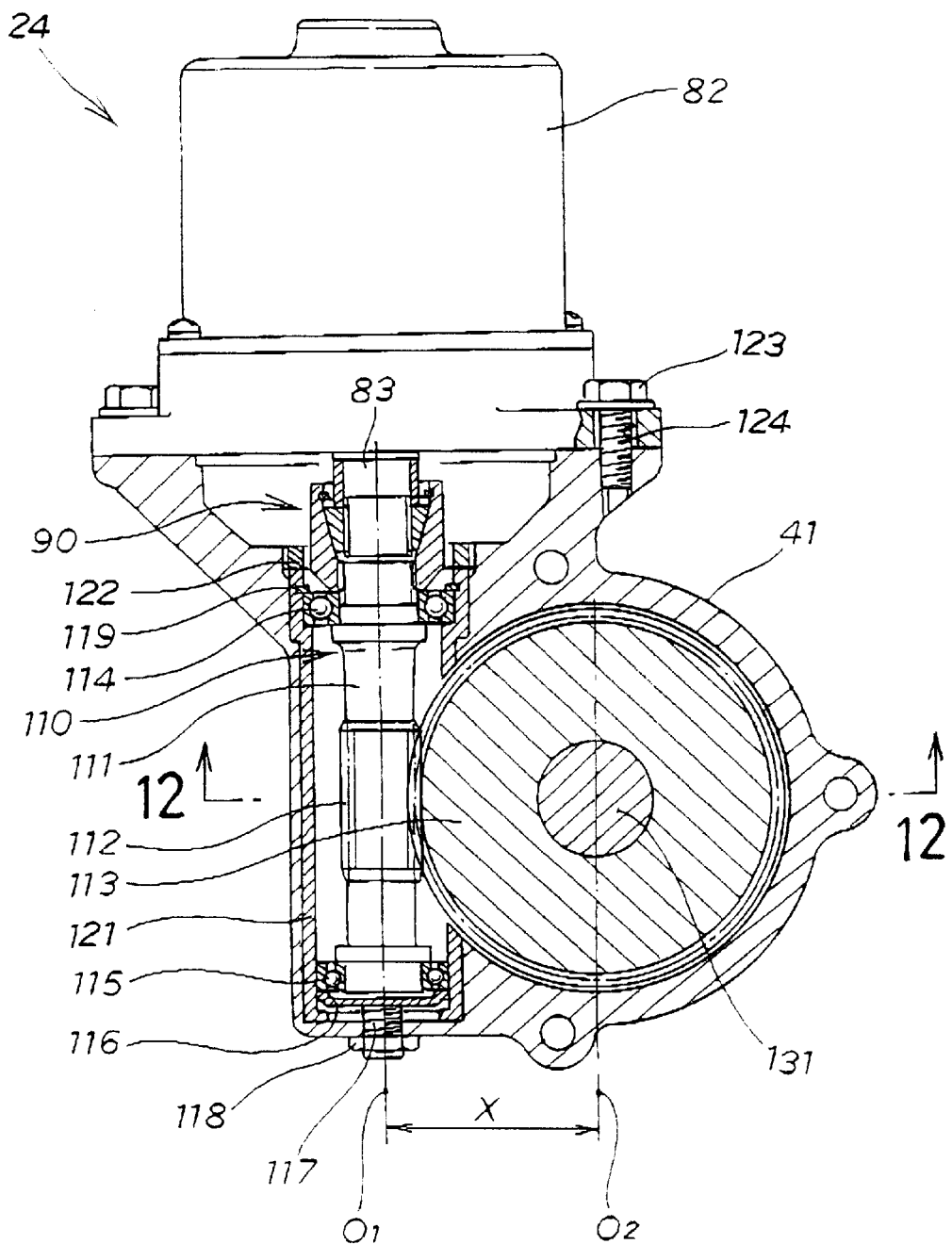
FIG. 11 is a sectional view of a variation of the geared reduction mechanism.

Reference is made next to FIG. 11 showing an alternative version of the support structure for transfer shaft 111 in the reduction mechanism 110.

The support structure of this alternative embodiment is characterized by supporting transfer shaft 111 on housing 41 by way of intervening first and second bearings 114, 115 and eccentric sleeve 121. Eccentric sleeve 121 is a cylindrical sleeve fit rotatably in a hole in housing 41. The first and second bearings 114, 115 are fit inside the hole inside this cylindrical sleeve, and transfer shaft 111 is supported rotatably by the first and second bearings 114, 115. By using a ring bolt 122 to push eccentric sleeve 121 in the direction of the longitudinal axis of eccentric sleeve 121 to housing 41, the eccentric sleeve 121 can be held in housing 41 by friction.

Figure 12:
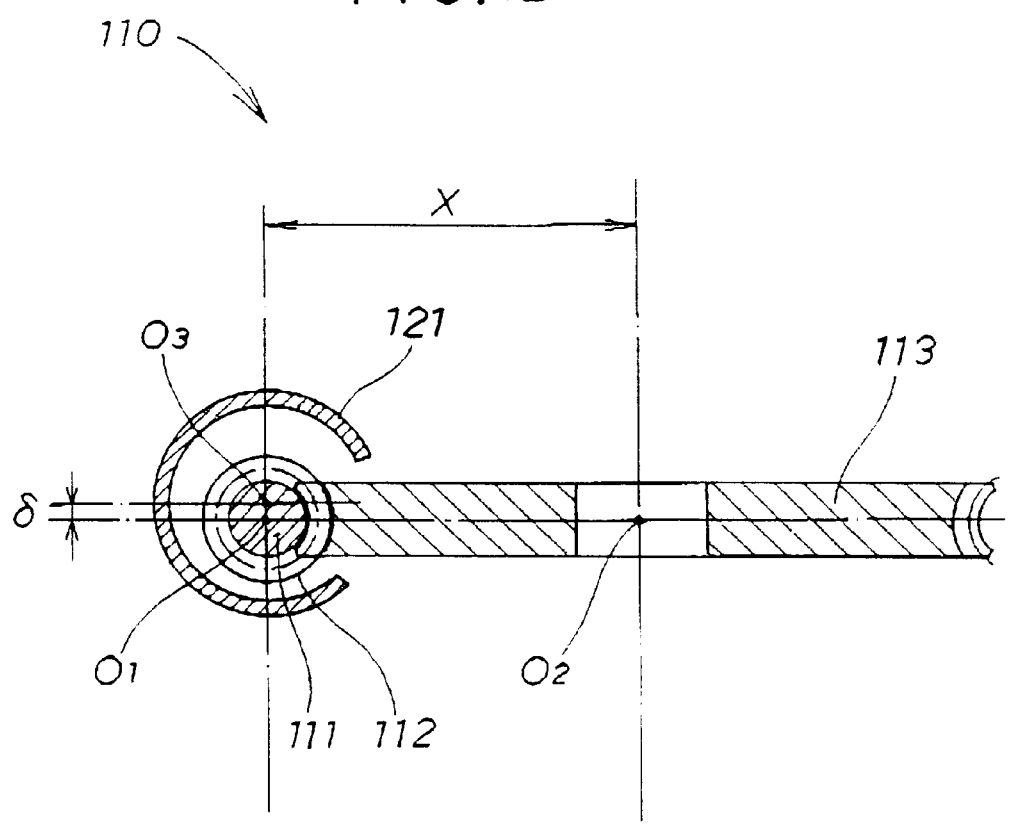
FIG. 12 is a sectional view taken along line 12—12 of FIG. 11.

Reference is now made to FIG. 12 showing the relationship between worm 112, worm wheel 113, and eccentric sleeve 121.

As shown in FIG. 12, worm 112 is positioned with its center axis $0_1$ (center $0_1$ of transfer shaft 111) offset distance δ below the center axis $0_3$ of eccentric sleeve 121. Because transfer shaft 111 is supported by first and second bearings 114, 115 at this offset position of eccentric sleeve 121, the center axis $0_1$ of worm 112 moves eccentrically to worm wheel 113 of center axis $0_2$ when eccentric sleeve 121 rotates. As a result, the distance X from worm center $0_1$ to worm wheel 113 center $0_2$ changes. It is therefore possible to easily adjust for backlash of worm 112 to worm wheel 113 by simply turning eccentric sleeve 121. It should be noted that it is also preferable in this alternative version for the worm 112 to be metal, the tooth surfaces thereof to be coated with a low friction coefficient material, and the worm wheel 113 to be made from resin.

It is therefore possible to adjust the tooth surfaces of worm 112 and worm wheel 113 so that there is no backlash therebetween, and to apply pressure causing the tooth surfaces of worm 112 and worm wheel 113 to mesh. Eliminating backlash also eliminates play in the meshing of worm 112 and worm wheel 113, and thus prevents torque shock from the inertia of motor 82 (see FIG. 10) from working from the tooth surfaces of worm 112 to the tooth surfaces of worm wheel 113. The durability of reduction mechanism 110 is thus also further improved in this variation of this first preferred embodiment of the invention.

The procedure for adjusting meshing of this reduction mechanism 110 is as follows.

(1) With motor 82 and ring bolt 122 in FIG. 11 removed, eccentric sleeve 121 is gradually turned using a tool. This moves center axis 01 of transfer shaft 111, and thus allows adjusting backlash of worm 112 to worm wheel 113.

(2) After completing this backlash adjustment, ring bolt 122 is tightened to secure eccentric sleeve 121 to housing 41 by means of friction force.

(3) The assembly of torque limiter 90 and motor 82 is inserted to housing 41 and fit to transfer shaft 111.

(4) The motor 82 is mounted to housing 41 using bolt 123 to complete the task. Note that the diameter of bolt hole 124 in motor 82 is slightly larger than a normal bolt hole diameter. It is therefore possible to easily adjust the center of motor output shaft 83 to the center axis 01 of transfer shaft 111.

It will also be obvious to one with ordinary skill in the related art that torque limiter 90 of the present invention shall not be limited to a friction type torque limiter as described in the above first exemplary embodiment.

Furthermore, the geared reduction mechanism 110 shall not be limited to a worm gear mechanism, and can be, for example, a bevel gear mechanism or spur gear mechanism.

In an alternative, the second rack 134 provided on the rack shaft 35 may be extended to function also as the first rack 34.

In this instance, the first pinion 33 and first rack 34 may comprise the same helical gears as the second pinion 133 and second rack 134 and have hyperbolic tooth profile.

Next, discussion will be made as to an electric power steering apparatus according to the second embodiment with reference to FIG. 13 to FIG. 21. Through out these figures, like components will be designated by like reference numerals and their description will be omitted.

Figure 13:
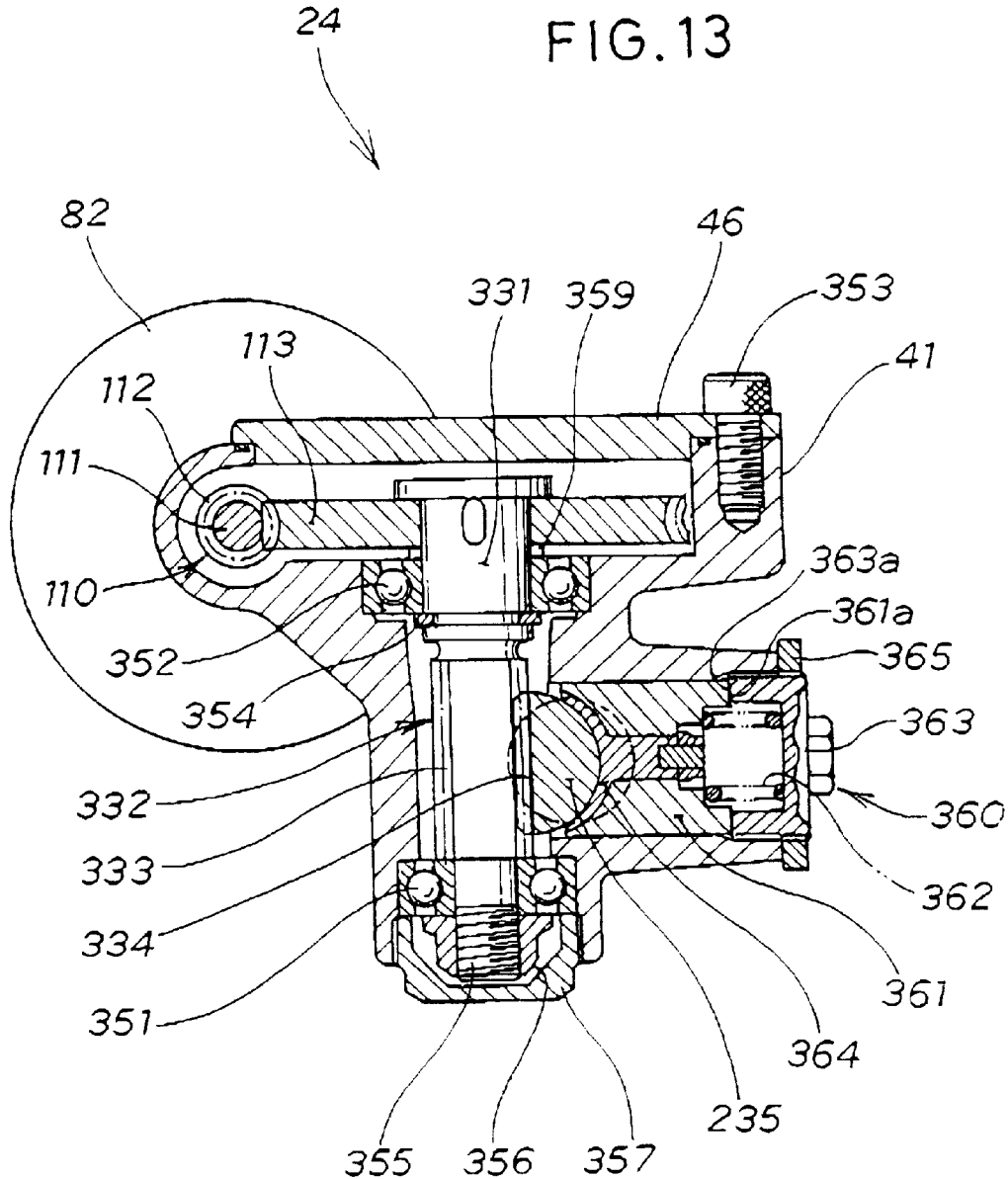
FIG. 13 is a sectional view illustrating an assist torque mechanism according to a second embodiment of the present invention.

FIG. 13 is a sectional view illustrating an assist torque mechanism 24 corresponding to the one according to the first embodiment shown in FIG. 5.

Assist torque mechanism 24 houses torque limiter 90 (see FIG. 1), reduction mechanism 110, pinion shaft 331, and second rack-and-pinion mechanism 332 in housing 41 with the top opening closed by a lid 46.

Housing 41 rotatably supports the top and bottom parts of pinion shaft 331 by way of two intervening bearings 351, 352. Housing 41 also has a second rack guide 360. Note that a lid mounting bolt 353 and snap ring 354, are also shown.

The second pinion 333 and second rack 334 are also plastically formed components such as roll forgings. The pinion shaft 331 has thread 355 formed on the end thereof with the second pinion 333 formed integrally thereto at the bottom end above thread 355. The second rack 334 is formed on rack shaft 35. Both the second pinion 333 and second rack 334 are helical gears. The tooth profile of these helical gears is hyperbolic. This tooth profile is the same as that of the second pinion 133 and second rack 134 of the first embodiment shown in FIGS. 8A to 8D, and further details thereof are thus omitted here.

Movement in the axial direction of pinion shaft 331 is limited by screwing nut 356 onto thread 355. Note that cap nut 357 and spacer 359 are also shown in the Figure.

The second rack guide 360 has a guide member 361 contacting the rack shaft 35 from the side opposite the second rack 334, and an adjustment bolt 363 for pushing against the guide member 361 by way of intervening compression spring 362. By adjusting adjustment bolt 363 threaded into housing 41 to push on guide member 361 by way of intervening compression spring 362 with appropriate pressure, this second rack guide 360 keeps second rack 334 pressed to second pinion 333. Note that contact 364 slidably supporting the back of rack shaft 35, and lock nut 365, are also shown.

When the second rack 334 is in meshing engagement with second pinion 333 as shown in FIG. 13, end 363a of adjustment bolt 363 presses directly against the back 361a of guide member 361 in this second rack guide 360.

The relationships between the motor 82, torque limiter 90, and geared reduction mechanism 110 are the same as those shown in the first embodiment discussed in relation to FIGS. 4, 5 and 6, and further description thereof is thus omitted here.

FIG. 14 and FIG. 15 are perspective and sectional views of part of the rack shaft according to the second embodiment.

Rack shaft 35 is a round rod of diameter D1 with second rack 334 formed at a longitudinal part thereof. The length M of the part 39 where the rack 334 is formed is long enough to permit the rack shaft 35 to slide right and left only up to the maximum steering angle of the steered wheels 21 (see FIG. 1).

As shown in FIG. 15, tooth width W1 of the second rack 334 formed on the rack shaft 35 is greater than diameter D1 of the rack shaft 35 in that part of the rack shaft 35 where the second rack 334 is not formed, that is, W1>D1.

The second rack 334 formation part 39 has a basically semicircular section with the rack formation surface flat.

Thickness T1 is reduced by an amount commensurate with the increase in tooth width W1. Thickness T1 is the thickness from the crown of the second rack 334 to the back of the rack shaft 35, and is obviously less than diameter D1 (T1<D1). By thus increasing the diameter of the rack shaft 35 only by the increase in the tooth width in the part of the rack 334, the overall weight of the rack shaft 35 can be limited.

The mechanical strength (bending strength and bearing strength) of the second rack 334 is greatly improved as a result of increasing the tooth width W1 of the rack 334. At the same time the part of the rack shaft 35 where the rack 334 is not formed only slides in order to turn the steered wheels, and the rack shaft therefore only needs to be as rigid as a conventional rack shaft. Because the width of the rack shaft 35 in the area of the pinion 33 and rack 34 is increased only by the amount of tooth width W1 and the thickness T1 of this area is decreased a comparable amount relative to diameter D1 of the rack shaft 35, rack formation part 39 is offset to the pinion side from rack shaft center axis R1 (see FIG. 13).

The section area of the rack formation part 39 is therefore substantially identical to the section area of the rack shaft 35, and there is substantially no change in the weight of the rack shaft 35 even though width W1 in the rack formation part 39 is greater than diameter D1 of the rack shaft 35. It is therefore possible to limit the overall weight of the rack shaft 35.

By increasing the width W1 of the second rack 334, it is possible to limit the weight of the rack shaft 35 while simultaneously increasing the mechanical strength (bending strength and bearing strength) of the second pinion 333 and second rack 334 as described above.

Moreover, because the rack shaft 35 is pushed to the second pinion 333 by the second rack guide 360 (see FIG. 13 from the side opposite the second rack 334, reducing thickness T1 has no practical effect on the bending rigidity of the rack shaft 35.

Second rack-and-pinion mechanism and rack may be plastically formed components such as forgings.

Figure 16:
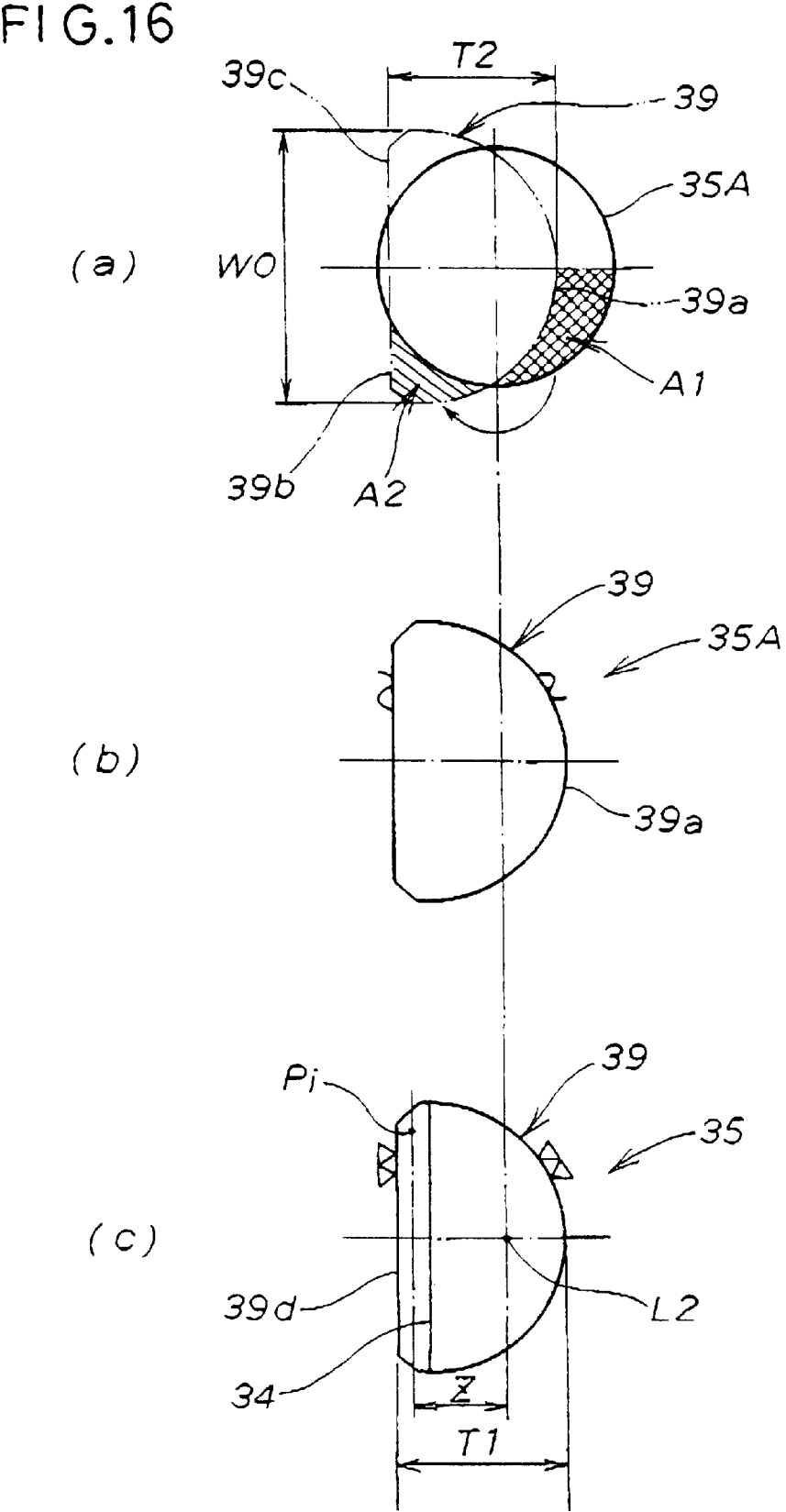
FIG. 16(a) to FIG. 16(c) show the manufacturing steps for the rack shaft shown in FIG. 15.

Referring next to FIG. 16, discussion will be made next as to the mode of production of the rack shaft shown in FIGS. 14 and 15.

In (a) of FIG. 16, the rack formation part 39 only of steel rod 35A is forged to the desired substantially semicircular section indicated by the double-dot dash line. Note that the section area A1 behind back 39a of rack formation part 39 is substantially equal to the section area A2 of the protruding lower part 39b or upper part 39c of rack formation part 39. In other words, by forging rack formation part 39 to width W0, section areas A1 and A2 are substantially identical, and width T2 is thus determined. Therefore, the section area of rack formation part 39 indicated by the double-dot dash line, and the section area of rod 35A indicated by the solid line, are substantially equal, and there is no change in the weight of rack shaft 35 even though width W of rack formation part 39 is greater than the diameter of rod 35A.

Shown in (b) of FIG. 16 is the rack formation part 39 resulted from the forging step.

The surface of rack formation part 39 is then machined smooth as shown in (c) of FIG. 16. Second rack 334 is formed on the flat face (rack formation face) 39d by roll forging or other process to finish production.

Figure 17:
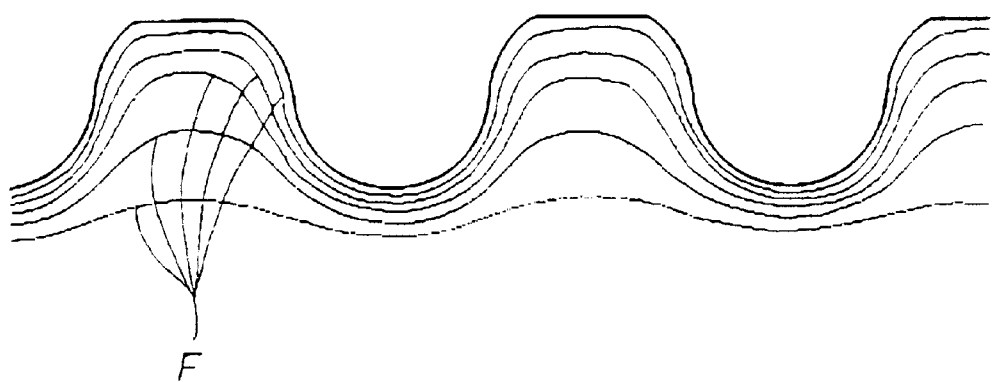
FIG. 17 is a schematic diagram of the tooth profile of a pinion and rack in the second embodiment.

Next, reference is made to FIG. 17 schematically showing the tooth profile of the second pinion and second rack. The fiber structure F of the tooth profile of the second pinion 133 and the tooth profile of the second rack 134 flows continuously along the tooth profile. This fiber structure F is also commonly referred to as the metal fibers (process fibers) and is referred to as metal flow lines in the case of forgings.

As noted above, the second pinion 133 and second rack 134 are plastically processed, and the tooth profile of the pinion 133 and rack 134 is a circular arc.

Plastically processed components are processed components that have been manufactured to a specific shape and dimension by hot or cold plastic deformation of a material, and include, for example, rolled components and forged components such as roll forgings. Roll forging is a type of rolling process, and is included as a forging process in the present invention. To achieve the tooth profiles of the second pinion 133 and second rack 134 by means of roll forging, a tool with the desired tooth profile is gradually pressed into the material to achieve the specified tooth profile. Roll forging offers high productivity and enables continuous production.

Some advantages of plastically processed gears compared with machined gears include the following.

(1) A continuous fiber structure F following the tooth profile can be obtained as shown in FIG. 17, thereby increasing strength, and offering greater bending strength and wear resistance in the gear teeth compared with machined gears in which the fiber structure F is interrupted (not continuous).

(2) There is no residual stress produced in the tooth surfaces as there is with machining processes, and there is thus less deformation during hardening. It is therefore possible to maintain good meshing without correcting the tooth profile after hardening in order to assure the required finishing precision in the circular arc tooth profile gears. The manufacturing process is thus shortened, and productivity improved.

(3) Marks (process marks) determined by the tip shape and the feed rate of the tool used for surface machining are left on the tooth surfaces of machined gears.

Gears manufactured with a plastic process, however, have no process marks left on the tooth surface by the machining process, can be manufactured to a uniform surface roughness on the tooth surfaces, have a smooth surface roughness on the teeth, and little variation in dimensional precision. Friction from sliding tooth surfaces is therefore extremely low, the transfer efficiency of the second rack-and-pinion mechanism is high, and meshing noise is low.

Next, operation of the rack shaft according to the second embodiment (described in relation to FIGS. 14 and 15) will be described in comparison with the reference shaft shown in FIGS. 18 to 20.

Rack shaft 35 shown in FIG. 18 is a straight rod having a supported part 35x supported by the housing and a rack formation part 39x where a rack 34x is formed. The supported part 35x has a circular section of diameter D1. M represents the length of rack formation part 39x while L2 designates the center of the rack shaft 35.

FIG. 19 shows a pinion 33x meshed with the rack 34x. The rack formation part 39x has a circular section of the same diameter as the supported part 35x. Note that tooth width W2 of the rack 34x is determined by the distance Z from center L2 to the reference pitch line Pi of the rack 34x. It will also be obvious that width W2 is less than the diameter D1 of supported part 35x (W2<D1).

The pitch circle diameter of the pinion 33x is d2, and the distance from center L1 of the pinion 33x to center L2 of the rack shaft 35 is Y1.

In the section view of rack formation part 39x shown in FIG. 19 let points C1 and C2 be the end points of the rack tooth width on reference pitch line Pi of rack 34x, and let point C3 be the intersection between the outside circumference (arc) of rack formation part 39x and a line passing through point C2 perpendicular to reference pitch line Pi. Point C3 is also at the intersection of a line passing through point C1 and center L2 of the section (rack shaft 35). The triangle of which the vertices are C1, C2, and C3 is therefore a right triangle. The length of side C1–C2 is W2, the length of side C2–C3 is (2* Z), and the length of side C1–C3 is diameter D1.

FIG. 20 shows the right triangle of vertices C1, C2, and C3. It will be obvious that the length W2 of sides C1–C2 can be obtained using the following equation.

$$W2 = \sqrt{(D1)^2 - (2 \times Z)^2}$$

As previously described, tooth width W1 of the rack 34 shown in FIG. 15 is greater than the diameter D1 of end 35g (supported part), that is, W1>D1. If the diameter D1 of supported part 35g in FIG. 15 is equal to diameter D1 of supported part 35x in the comparative rack shaft shown in FIG. 19, then tooth width W1 of the rack 334 in the present embodiment is greater than the tooth width W2 of the rack 34x in this comparison.

Thus, in the present embodiment as shown in FIG. 15, rack formation part 39 is formed so that tooth width W1 of the second rack 334 is greater than the hypothetical tooth width W2 of the rack 334, which is determined by the dimension specified for distance Z, which is the distance from center L2 to the reference pitch line Pi of the rack 334, when rack formation part 39 is assumed to be coaxial to center L2 of supported part 35g and have the same diameter (D1) as the supported part 35g. Tooth width W1 in the embodiment shown in FIG. 15 is approximately 1.5 times tooth width W2 of the comparison shown in FIG. 19.

Because the tooth width W1 of the second rack 334 is increased as shown in FIG. 15, the mechanical strength (bending strength and bearing strength) of rack 334 is significantly improved. Because the part of the rack shaft 35 where the rack 334 is not formed must be able to slide in order to turn the steered wheels, it must have the same rigidity as a conventional rack shaft. Therefore, only tooth width W1 of the rack 334 is increased in the rack shaft 35, and thickness T1 is decreased an equivalent amount. Because thickness T1 of the rack formation part 39 is less than diameter D1 of the rack shaft 35, the rack formation part 39 is offset from center L2 of rack shaft 35 toward the second pinion 333. As a result, the section area of rack formation part 39 is substantially equal to the section area of rack shaft 35, and there is substantially no change in the weight of rack shaft 35 even though rack tooth width W1 is greater than rack shaft diameter D1. It is therefore possible to limit the weight of the rack shaft 35.

As will be obvious from the above, the weight of the rack shaft 35 can be limited while at the same time increasing the mechanical strength (bending strength and bearing strength) of the rack 334 as a result of increasing the tooth width W1 of the second rack 334.

It should also be noted that even if the rack guide 60 pushes toward the pinion 333 as shown in FIG. 13 from the side opposite the rack 334, there is no practical effect on the bending rigidity of the rack shaft 35 as a result of reducing thickness T1.

Discussion will be made next as to a rack-and-pinion mechanism in an electric power steering apparatus 400 according to a third preferred embodiment of the present invention with reference to FIG. 21 to FIG. 28. It should be noted that like parts in this and the first embodiment are identified by like reference numerals, and further description thereof is omitted.

First pinion 433 and first rack 434 of the first rack-and-pinion mechanism 432 transfer only a steering torque and can thus be involute as in the first embodiment.

Reference is now made to FIG. 21 to FIG. 23 illustrating in plan and section a single rack shaft and two rack-and-pinion mechanisms according to a second embodiment.

As shown in FIGS. 21 to 23, center line L2 is the axis of end 35g of rack shaft 435 supported by housing 41 during normal conditions. Center line L4 is the axis of rack formation part 439 where first and second racks 434, 534 are formed on rack shaft 435. Rack shaft 435 according to this preferred embodiment is characterized by center L4 of rack formation part 439 being offset distance Q to the side opposite first and second racks 434, 534, that is, to a back 439f of a flat 439e on which the first and second racks 434, 534 are formed.

As shown in FIG. 21, first bearing 47 supports end 35g of rack shaft 35, that is, the end near second rack 534. The second bearing 48 supports the other end 35h of rack shaft 35, that is, the end near first rack 434, with a slight gap δ therebetween. When the other end 35h deflects a distance equal to gap δ due, for example, to road reaction, other end 35h can be supported by second bearing 48.

As shown in FIGS. 22 and 23, the back 439f of the flat 439e where the first and second racks 434, 534 are formed is a curved convex surface referenced to center L4 of the rack shaft 35.

Figure 24:
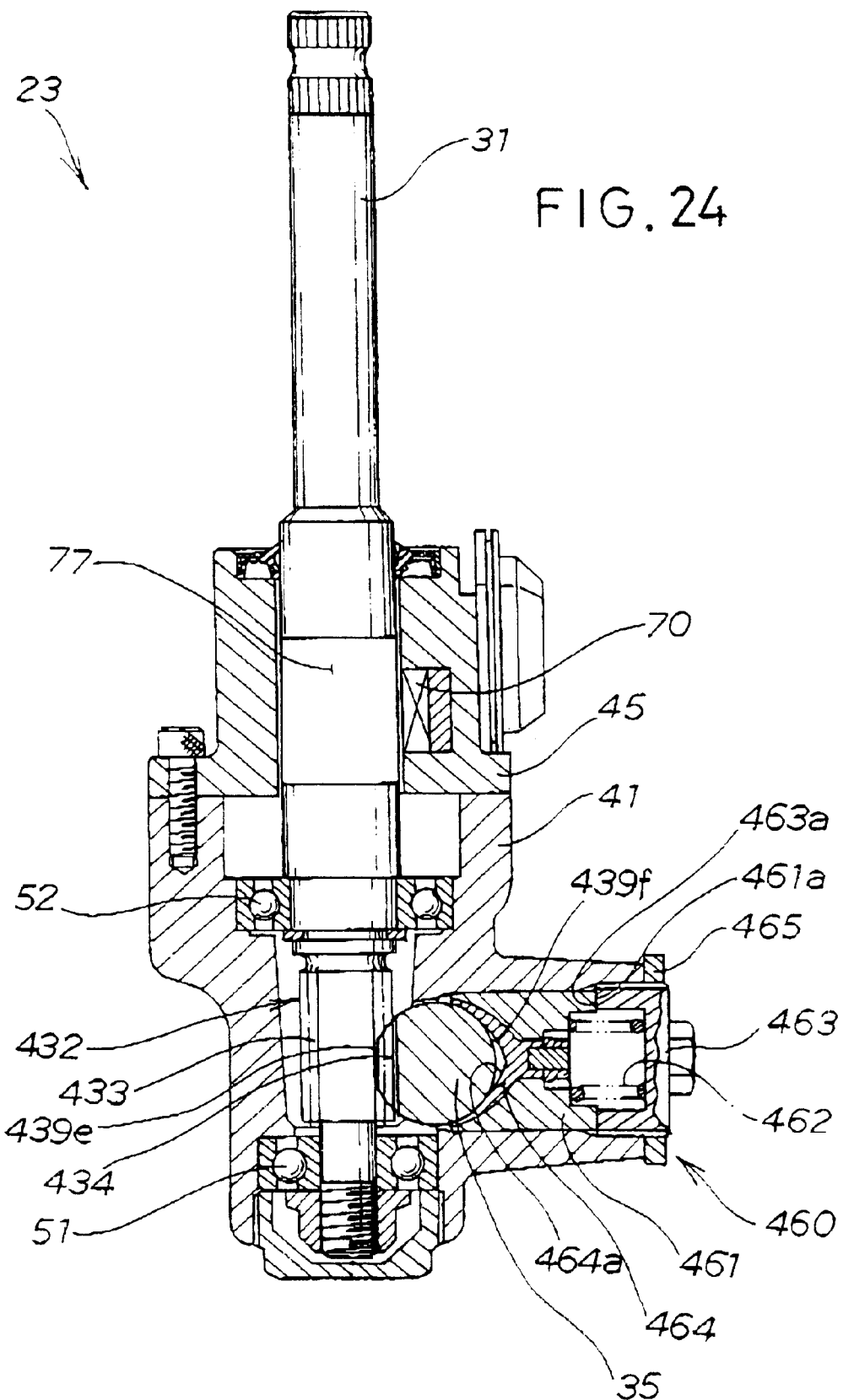
FIG. 24 is a sectional view of the steering mechanism of the third embodiment.

FIG. 24 is a sectional view corresponding to FIG. 4 related to the first embodiment but illustrating the steering mechanism 23 according to a third embodiment.

Steering mechanism 23 according to the third embodiment includes a housing 41 housing therein an input shaft 31, a steering torque sensor 70 and a first rack-and-pinion mechanism 432. Top opening of the housing 41 is covered by a lid 45. The housing 41 further has a first rack guide 460.

Back 439f (that is, the side opposite the first rack 434) of a flat 439e where the first rack 434 is formed on the rack shaft 35 is convex, and is pushed by a concave end 464a of the first rack guide 460 toward the first rack 434.

First rack guide 460 has a guide member 461 contacting back 439g of rack shaft 35, and adjustment bolt 463 for pushing back 461a of guide member 461 to rack shaft 35 by way of intervening compression spring 462.

Guide member 461 has formed on the end thereof a contact 464 enabling the back of rack shaft 35 to slide thereagainst. The contact 464 can be formed integrally to guide member 461. Concave end 464a is formed on the end of contact 464, and guide member 461 thus has a concave end 464a.

When the first rack 434 meshes with the first pinion 433 as shown in FIG. 24, end 463a of an adjustment bolt 463 presses directly against the back 461a of the surface on which concave end 464a is formed on guide member 461 in this first rack guide 460. Note that lock nut 465 is also shown.

Figure 25:
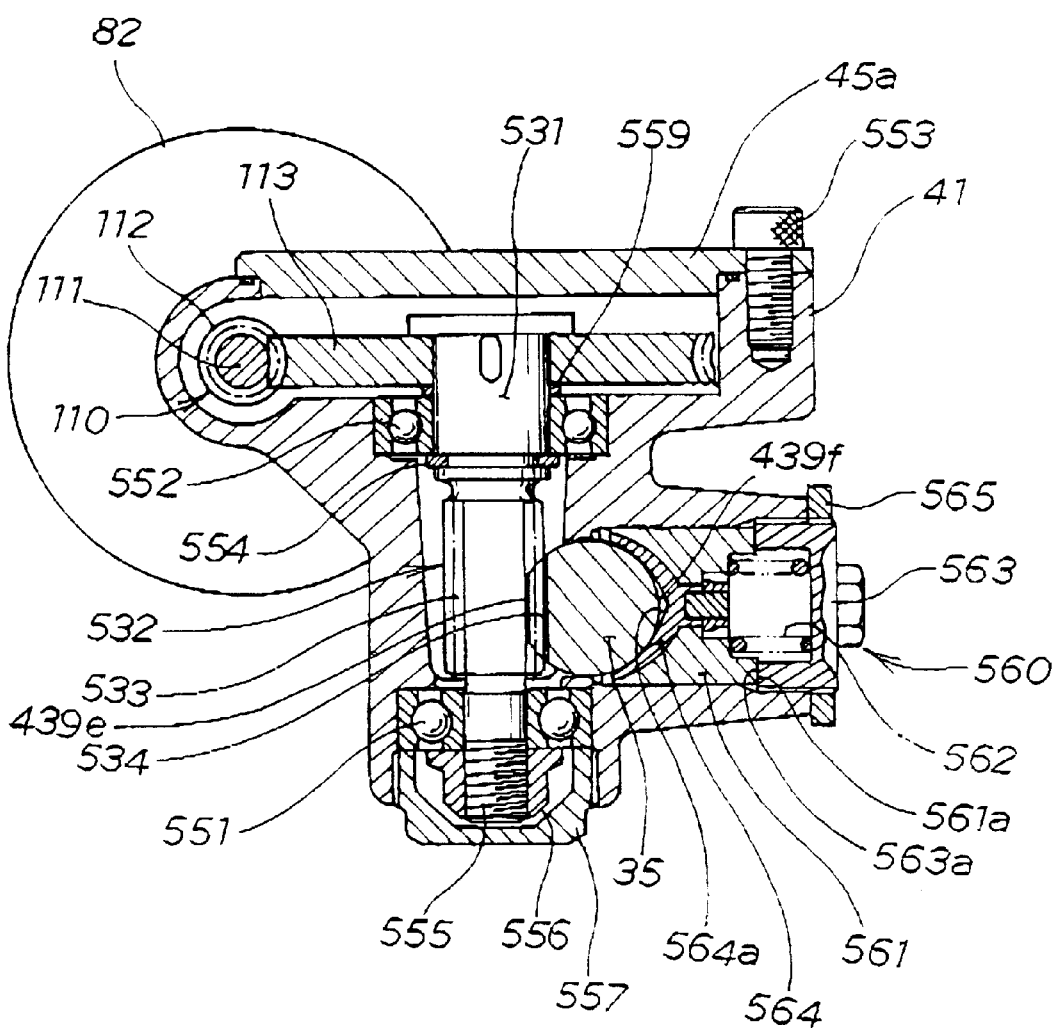
FIG. 25 is a sectional view of the torque assist mechanism of the third embodiment.

FIG. 25 is a sectional view corresponding to FIG. 5 related to the first embodiment but illustrating an assist torque mechanism 24 employed in an electric power steering apparatus according to the third embodiment of the present invention.

In the assist torque mechanism 24, a torque limiter, a geared reduction mechanism 110, a pinion shaft 531, and a second rack-and-pinion mechanism 532 are housed in a housing 41 with a top opening closed by a lid 45a.

Housing 41 rotatably supports the top and bottom parts of the pinion shaft 531 by means of two bearings 551, 552. The housing 41 also has a second rack guide 560. Note that a lid mounting bolt 553 and snap ring 554, are also shown.

Pinion shaft 531 has thread 555 formed on the end thereof with the second pinion 533 formed integrally thereto at the bottom end above thread 555. The second rack 534 is formed on the rack shaft 35. Both the second pinion 533 and second rack 534 comprise helical gears. The tooth profile of these helical gears is a circular arc. This tooth profile is the same as that of the second pinion 133 and second rack 134 of the first embodiment, and further details thereof are thus omitted here.

Movement in the axial direction of the pinion shaft 531 is limited by screwing nut 556 onto thread 555. Note that cap nut 557 and spacer 559 are also shown in the figure.

Back 539*f* (that is, the side opposite the second rack 534) of a flat 439*e* where the second rack 534 is formed on the rack shaft 35 is convex, and is pushed by a concave end 564*a* of the second rack guide 560 toward second rack 534.

Second rack guide 560 has a guide member 561 contacting the back 539*f* of the rack shaft 35, and an adjustment bolt 563 for pushing a back 561*a* of the guide member 561 against the rack shaft 35 by means of a compression spring 562.

Guide member 561 has formed on the end thereof a contact 564 enabling the back of the rack shaft 35 to slide thereagainst This contact 564 may be formed integrally with the guide member 561. Concave end 564*a* is formed on the end of the contact 564, and the guide member 561 thus has a concave end 564*a*.

When the first rack 534 meshes with the pinion 533 as shown in FIG. 25, end 563*a* of the adjustment bolt 563 presses directly against the back 561*a* of the surface on which the concave end 564*a* is formed the on guide member 561 in the second rack guide 560. Reference numeral 565 designates a lock nut 565.

Next, relations between the rack shaft and rack guide according to the third embodiment shown in FIGS. 24 and 25 will be discussed with reference to the first rack-and-pinion mechanism 432 and first rack guide 460 shown in FIGS. 26 to 28.

Back 439*f* of a flat 439*e* where the first rack 434 is formed, that is, the side of the rack shaft 35 opposite the rack 434, is convex so that the concave end 464*a* of the first rack guide 460 pushes the convex surface toward the rack side.

First rack guide 460 comprises a guide member 461 contacting the back 439*f* of the rack shaft 35, and an adjustment bolt 463 for urging a back 461*a* of the guide member 461 toward rack shaft 35 by means of a compression spring 462.

By appropriately setting the adjustment bolt 463 in the housing 41 with the first rack guide 460, the compression spring 462 pushes the guide member 461 with an-appropriate force against the rack 434, thereby pushing the first rack 434 against the first pinion 433.

Rack shaft 35 is made from a rod stock with a flat 439*e* formed at that part facing the first pinion 433. The first rack 434 is formed on this flat 439*e*. The back 439*f* of the flat 439*e* on which the rack 434 is formed is a convex surface having an arc of which the center is center axis L4 of the rack formation part 39.

Guide member 461 has a contact 464 at the end thereof for enabling the back 439*f* of the rack shaft 35 to slide smoothly. Note that the contact 464 can be formed integrally with the guide member 461. This contact 464 has a concave end 464*a*. As a result, the guide member 461 has a concave end 464*a*. Note that the arc components defining the shape of the concave end 464*a* have a radius greater than the radius of the convex circular arc surface of the back 439*f*. Reference numeral 465 designates a lock nut FIGS. 26 and 27 are sectional views taken perpendicularly to the axis of the rack formation part 439 where the first rack 434 is formed. Let line L4 be the center of the rack formation part 439, line L1 be the center of the first pinion 433, and reference line L5 be orthogonal to line L1. As will be known from these figures, the top and bottom arcs of concave end 464*a* are linearly symmetrical to reference line L5.

If the back 439*f* of the rack shaft 35 contacts the concave end 464*a* at contact points 01 and 02, M1 is the line through top contact point 01 and center L4, and line M2 is through bottom contact point 02 and center L4, the slope of line M1 to reference line L5 and the slope of line M2 to reference line L5 are both α. Lines M1 and M2 are also perpendicular to tangents S of the arc of the back 439*f*.

Figure 26:
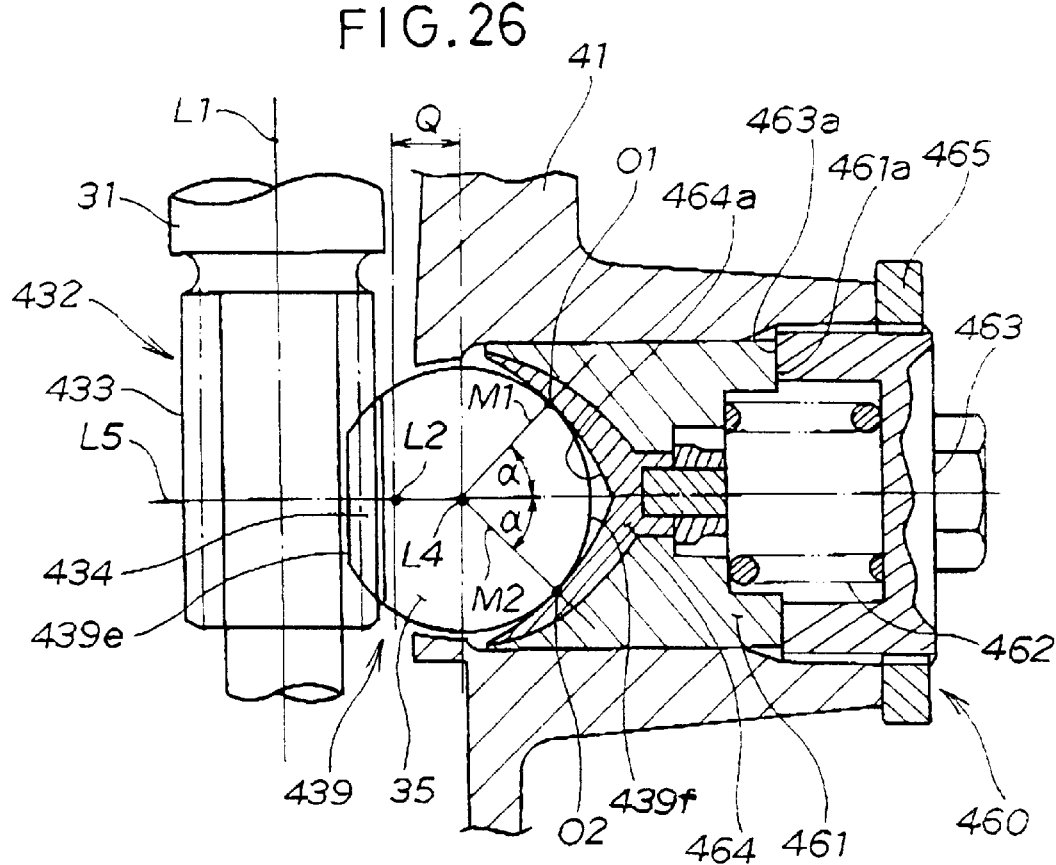
FIG. 26 is a sectional view of the rack-and-pinion mechanism and rack guide mechanism according to a third preferred embodiment.
Figure 28:
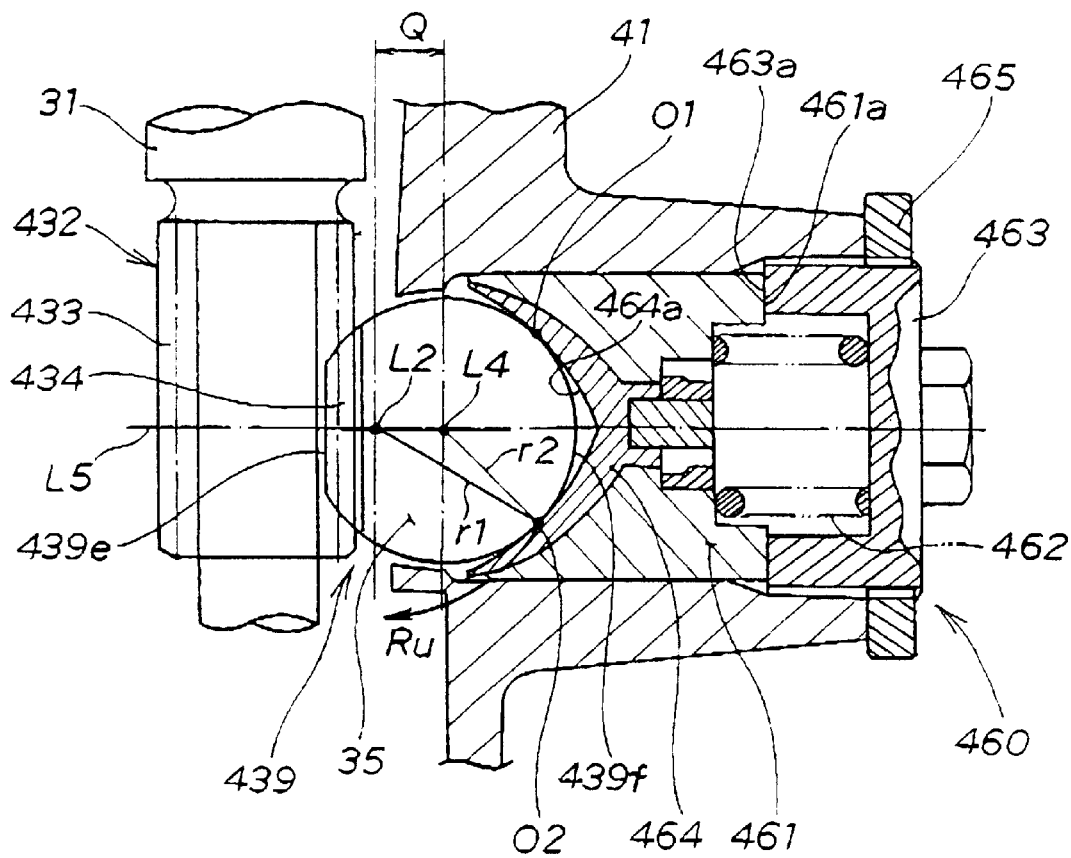
FIG. 28 is a sectional view showing the action of the rack-and-pinion mechanism and rack guide shown in FIG. 26.

FIG. 28 is a working diagram corresponding to FIG. 26 for the rack-and-pinion mechanism and rack guide.

When a rocking force occurs in conjunction with steering as a result of using helical gears for the first pinion 433 and first rack 434, or chassis vibration travels to the first rack-and-pinion mechanism 432, the vibration or rocking force acts on the rack shaft 35. If there is a slight gap between the first rack-and-pinion mechanism 432 and associated components, the rack shaft 35 will conceivably oscillate due to this rocking force. Some factors contributing to such a gap include the following.

(1) A gap develops due to wear between the tooth surfaces of the pinion 433 and rack 434.

(2) When a load acts on the first rack-and-pinion mechanism 432, (1) an extremely small gap develops in the bearings 51 and 52 supporting input shaft 31 (see FIG. 24), or (2) slight elastic deformation occurs in the guide member 461, which is made from a resin material, or play (a small gap) develops in related parts.

The third embodiment of the present invention is characterized by setting the positions of the first and second contact points 01 and 02 to center L2 of the rack shaft 35 supported by the housing 41 so that rocking of the convex part (back 439*f*) of the rack shaft 35 is limited at the concave end 464*a* when a rocking force acts on the rack shaft 35.

More specifically, the back 439*f* of the rack shaft 35 is a convex surface with an arc of radius r2 with its center at center L4 (point L4) of the rack formation part 439 where the first rack 434 is formed. The positions of first and second contact points 01 and 02 are therefore on the back 439*f*, and arc radius r2 of the convex surface is equal to the distance from center L4 to the contact points 01 and 02.

The position of center L4 of the rack formation part 439 is offset distance Q toward the back 439*f* from center L2 of the rack shaft 35. The distance from center L2 to contact point 01 is r1, and distance r1 is the rocking radius when a rocking force acts on the rack shaft 35. It will be obvious that rocking radius r1 is greater than arc radius r2 (r1>r2).

When the rack shaft 35 attempts to roll clockwise as seen in the figure from center L2 (in the direction of arrow Ru), the back 439*f* is limited by the concave end 464*a* at contact point 02. Rack shaft 35 is therefore unable to rock. Likewise when the rack shaft 35 attempts to roll counterclockwise as seen in the figure from center L2, the back 439*f* is limited by the concave end 464*a* at contact point 01. Rack shaft 35 is again therefore unable to rock.

Rack shaft 35 is thus housed so that it can slide longitudinally to housing 41 but cannot rock therein. Furthermore, the rack shaft 35 will not rock even when a rocking force works on the rack shaft 35 during steering. The first rack 434 will therefore become skewed to the first pinion 433, and high precision meshing of the pinion 433 and rack 434 can thus be maintained.

First rack guide 460 is characterized by end 463a of the adjustment bolt 463 pushing directly against the back 461a of the guide member 461, that is, the end opposite that where the concave end 464a is formed, when the first rack 434 engages the first pinion 433 as shown in FIG. 28.

Figure 27:
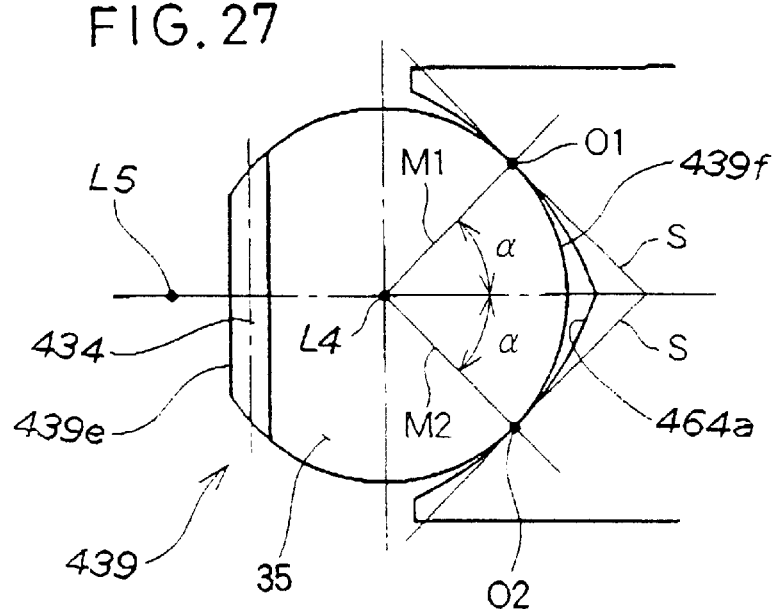
FIG. 27 shows the action of the rack shaft and rack guide shown in FIG. 26.

Operation explained in relation to FIGS. 26 to 28 will also apply to the second rack-and-pinion mechanism 532 and the second rack guide 560 shown in FIG. 25.

Figure 29:
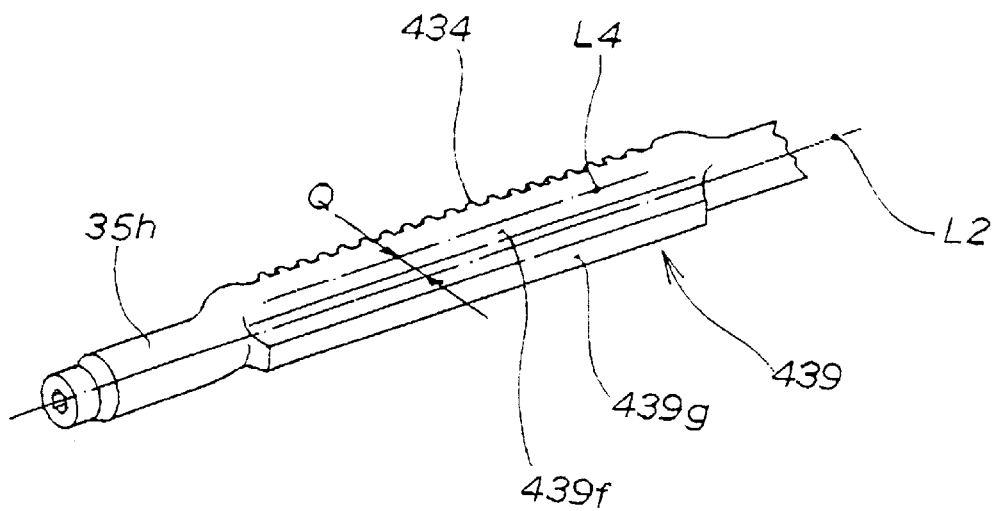
FIG. 29 is a perspective view of a variation of the third embodiment.
Figure 30:
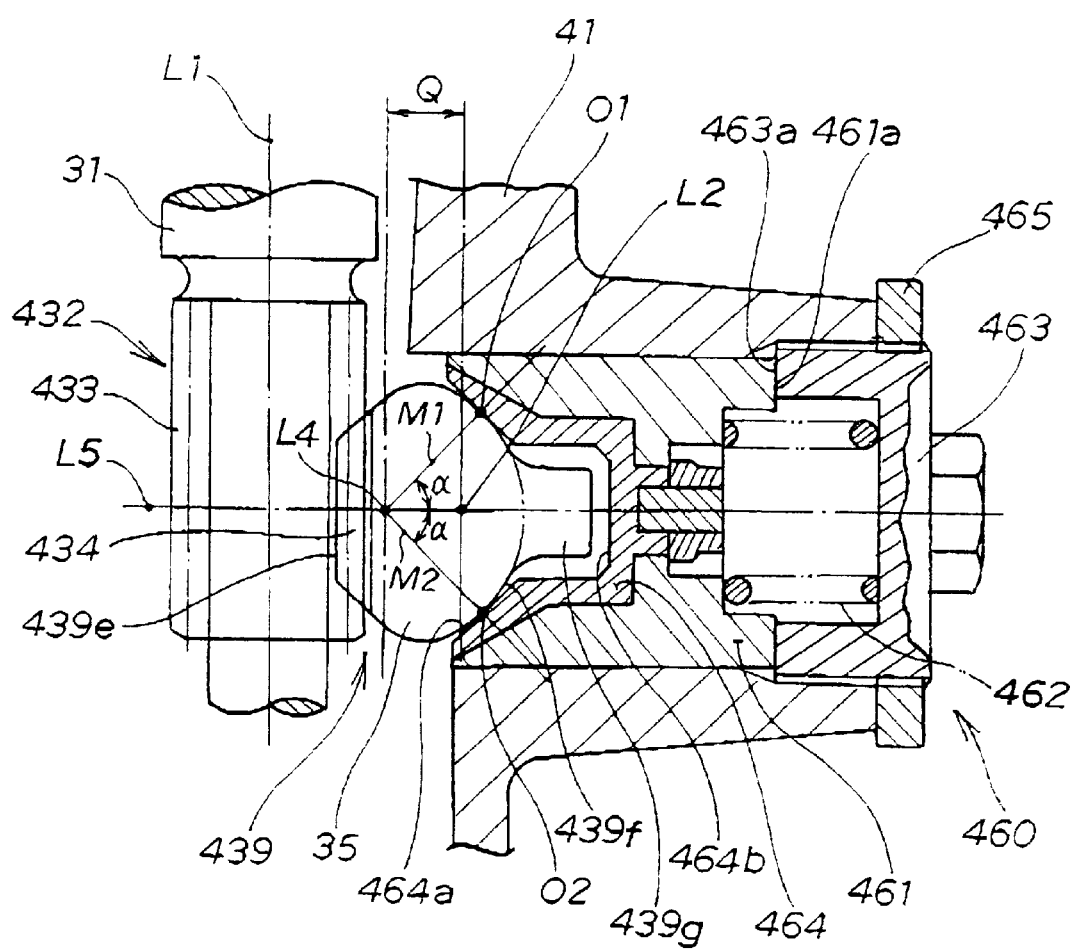
FIG. 30 is a sectional view of the rack-and-pinion mechanism and rack guide using the rack shaft shown in FIG. 29.
Figure 31:
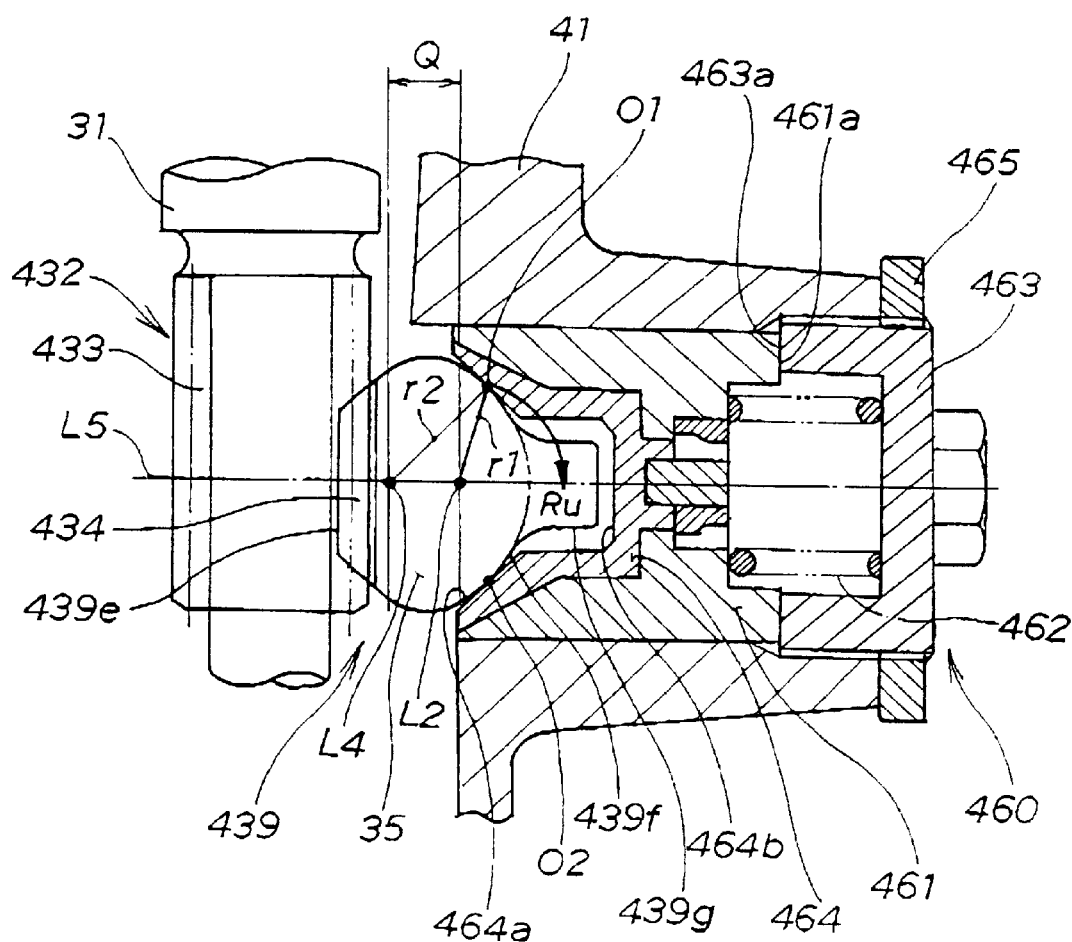
FIG. 31 is a sectional view showing the action of the rack-and-pinion mechanism and rack guide shown in FIG. 30.

FIGS. 29 to 31 illustrate a first variation of the rack-and-pinion mechanism according to the third embodiment. Explanation will be made below as to the first rack-and-pinion mechanism 432 and the first rack guide 460 as examples.

FIG. 29 is a partial perspective view of a first variation of the rack shaft with only the first rack illustrated.

In a rack shaft 35 according to the first variation, the center L4 of the rack formation part 39 where the first rack 434 is formed is offset distance Q to the rack side from center L2 of right and left ends 35g and 35h supported by a housing 41 (see FIG. 21).

FIG. 30 is a section view of the first rack-and-pinion mechanism 432 and first rack guide 460 in the electric power steering apparatus according to the first variation. The back of flat 439e where the first rack 434 is formed on the rack shaft 35 combines a curved convex surface 439f of which the center of the arc is point L4, that is, center L4 of the rack shaft 35, and extending therefrom a rectilinear protrusion 439g extending to the back, that is away from pinion 433, along reference line L5.

Concave end 464a has a tapered shape with two flat surfaces contacting the curved back 439f at first and second contact points 01 and 02. These two flat surfaces are thus tangent to the curved back 439f at first and second contact points 01 and 02. A center recess 464b is formed in the center of this taper to accommodate rectilinear protrusion 439g.

As shown in FIG. 31 and described above in the third embodiment with reference to FIG. 28, the positions of first and second contact points 01 and 02 are set relative to center L2 of the rack shaft 35 supported by the housing 41 so that rocking of the convex part (back 439f) of the rack shaft 35 is limited at the concave end 464a when a rocking force acts on the rack shaft 35.

The position of center L4 of the rack formation part 39 is offset distance Q toward the first rack 434 from center L2 of the rack shaft 35 supported by the housing 41. Rocking radius r1 is therefore less than arc radius r2 (r1<r2).

When the rack shaft 35 attempts to roll clockwise as seen in the figure from center L2 (in the direction of arrow Ru), the back 439f is limited by the concave end 464a at contact point 01. Rack shaft 35 is therefore unable to rock. Likewise when the rack shaft 35 attempts to roll counterclockwise as seen in the figure from center L2, the back 439f is limited by the concave end 464a at contact point 02. Rack shaft 35 is again therefore unable to rock.

The rack shaft 35 is thus housed so that it can slide longitudinally to the housing 41 but cannot rock therein.

Figure 32:
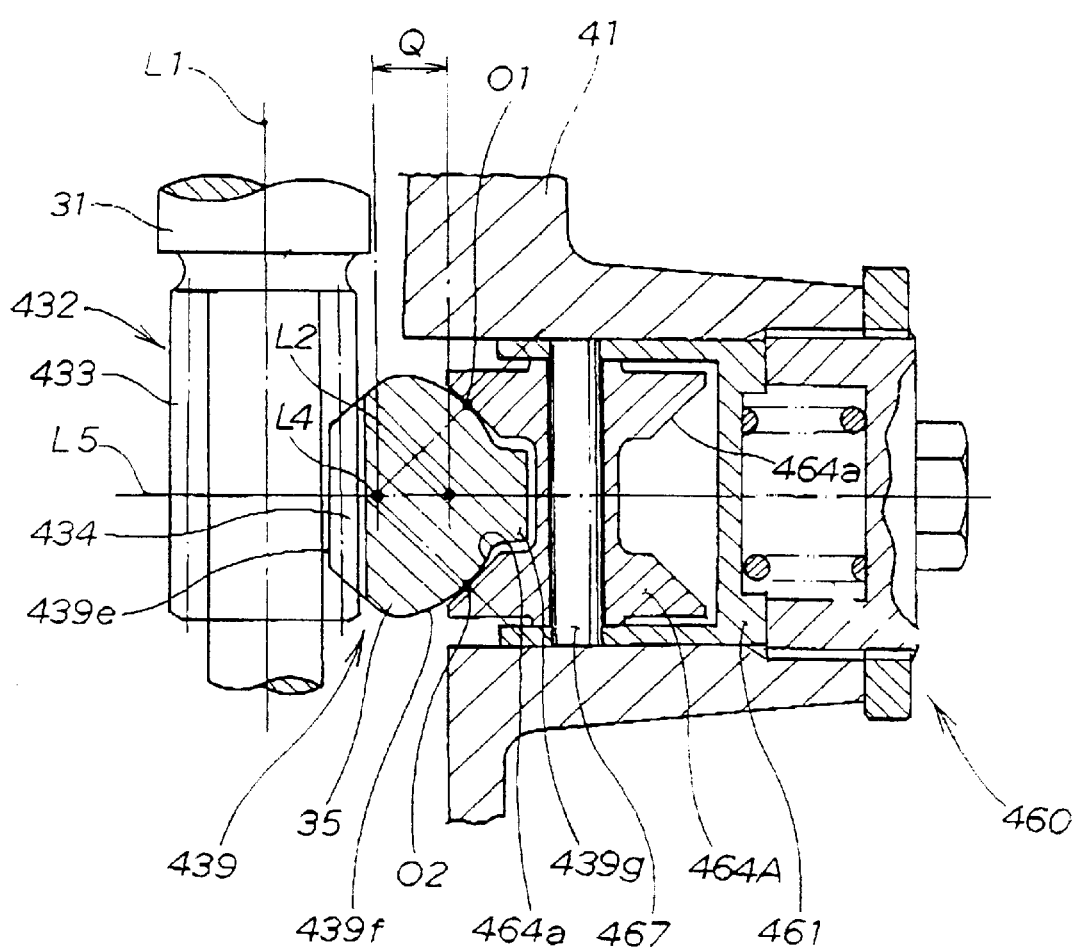
FIG. 32 is a sectional view of another variation of the third embodiment wherein the contact part of the rack guide is a rotating body.

FIG. 32 shows a further variation of the first variation shown in FIGS. 29 to 31.

This second variation is characterized by contact 464A being rotatably supported on the guide member 461 by means of a spindle 467. The contact 464A replaces contact 464 shown in FIG. 30. This contact 464A is a rotating body supported rotatably on spindle 467, which is disposed parallel to center L1 of pinion 433. Tapered concave end 464a is formed around the outside of contact 464A.

Obviously, various minor changes and modifications of the present invention are possible in the light of the above teaching. It is therefore to be understood that within the scope of the appended claims the invention may be practiced otherwise than as specifically described.

What is claimed is:

1. An electric power steering apparatus for assisting to steer steered wheels with a steering wheel, comprising:
   a housing;
   a rack shaft for steering the steered wheels, said rack shaft having a first rack and a second rack provided separately axially thereof;
   a supported part whereby said rack shaft is supported on the housing by means of intervening bearings, and a rack formation part where said first and second racks are formed, being disposed on said rack shaft;
   said rack formation part having an axis and a reference pitch line and said supported part having a diameter, wherein when a circular section perpendicular to the axis of said rack formation part is equal in diameter to the diameter of said supported part, and a distance from the center of said circular section to the reference pitch line is set to a specific dimension, said rack formation part having an actual tooth width greater than a second rack tooth width determined by the specific dimension;
   a first rack-and-pinion mechanism, including said first rack, for transferring a steering torque produced by turning a steering wheel to said rack shaft;
   an electric motor for producing an assist torque in accordance with the steering torque; and
   a second rack-and-pinion mechanism, including a pinion and said second rack, for transferring via a gear reduction mechanism the assist torque to said rack shaft,
   said pinion and said second rack of said second rack-and-pinion mechanism both being helical gears, one of said helical gears having a tooth profile wherein at least an addendum is a circular arc of which the radius of the arc of the addendum is generally centered on a reference pitch line, the other of said helical gears having a tooth profile wherein at least a dedendum is a circular arc of which the radius of the arc of the dedendum is generally centered on the reference pitch line, the circular arcs of the addendum and the dedendum of the tooth profile of each of the helical gears is point symmetrical with respect to the reference pitch line.

2. The electric power steering apparatus as defined in claim 1, wherein teeth of said pinion of said second rack-and-pinion mechanism have a helix angle set to be less than a friction angle of said helical gears.

3. The electric power steering apparatus as defined in claim 1, wherein said gear reduction mechanism comprises a combination of a driver gear and a driven gear,
   a tooth surface of said driver gear, or a tooth surface of said driven gear, or both, being coated with a low friction material coating,
   said driver gear and driven gear meshing with no backlash.

4. The electric power steering apparatus as defined in claim 1, further comprising a torque limiter intervening between said motor and said gear reduction mechanism.

5. The electric power steering apparatus as defined in claim 1, further comprising a steering torque sensor for detecting a steering torque, said steering torque sensor being a magneto-strictive sensor for detecting magnetostriction of a pinion shaft of said first rack-and-pinion mechanism.

6. The electric power steering apparatus as defined in claim 1, wherein said pinion and/or said second rack of said second rack-and-pinion mechanism is formed from a forging or other plastically processed part.

7. The electric power steering apparatus as defined in claim 1, wherein said rack shaft to which said second rack is formed is arranged such that a back on a side opposite that to which said second rack is formed is pushed toward said pinion by an adjustment bolt by way of an intervening rack guide member and a compression spring, a back of said rack guide member being pushed directly by said adjustment bolt when said pinion and said second rack mesh.

8. The electric power steering apparatus as defined in claim 1, wherein said rack shaft on which said first rack and said second rack are formed is housed in said housing which is unrockably and slidably in a longitudinal direction thereof.

9. The electric power steering apparatus as defined in claim 8, wherein a back of said rack shaft opposite a surface on which said second rack is formed is convex, and a rack guide with a guide member with a concave end, said guide member being disposed such that said concave end contacts said convex back at contact points and pushes said convex back of said rack shaft toward said second rack, said contact points being set in relation to said rack shaft supported by said housing so that said concave end limits rocking of the convex of said rack shaft when a rocking force acts on said rack shaft, and said rack shaft is thereby housed unrockably in said housing.

10. The electric power steering apparatus as defined in claim 9, wherein said rack guide pushes said guide member having said concave end to said rack shaft by means of an adjustment bolt through an intervening compression spring, said adjustment bolt pushing directly on said guide member when said pinion and said second rack mesh.

11. The electric power steering apparatus as defined in claim 1, wherein the actual tooth width of said rack formation part formed on said rack shaft is greater than a diameter of said supported part of said rack shaft.

* * * * *